US011368639B2

(12) United States Patent
Kuroda

(10) Patent No.: US 11,368,639 B2
(45) Date of Patent: Jun. 21, 2022

(54) PHOTOELECTRIC CONVERSION APPARATUS, IMAGE CAPTURING SYSTEM, METHOD FOR DRIVING PHOTOELECTRIC CONVERSION APPARATUS, AND MOVING OBJECT

(71) Applicant: CANON KABUSHIKI KAISHA, Tokyo (JP)

(72) Inventor: Yukihiro Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/033,189

(22) Filed: Sep. 25, 2020

(65) Prior Publication Data

US 2021/0099657 A1    Apr. 1, 2021

(30) Foreign Application Priority Data

Sep. 30, 2019  (JP) .............................. JP2019-180966
Jul. 31, 2020  (JP) .............................. JP2020-129815

(51) Int. Cl.
  *H04N 5/345*  (2011.01)
  *H04N 5/367*  (2011.01)
  *B60R 11/04*  (2006.01)
(52) U.S. Cl.
  CPC ........... *H04N 5/3454* (2013.01); *H04N 5/367* (2013.01); *B60R 11/04* (2013.01)
(58) Field of Classification Search
  CPC .. H04N 5/3454; H04N 5/367; H04N 5/37455; H04N 5/37452; B60R 11/04; H01L 27/14609
See application file for complete search history.

(56) References Cited

U.S. PATENT DOCUMENTS

| | | | | |
|---|---|---|---|---|
| 10,250,831 | B2* | 4/2019 | Tyrrell | H04N 5/37455 |
| 2005/0099516 | A1* | 5/2005 | Kagle | H04N 5/367 |
| | | | | 348/246 |
| 2006/0050158 | A1* | 3/2006 | Irie | H04N 5/367 |
| | | | | 348/246 |
| 2008/0117321 | A1* | 5/2008 | Muramatsu | H04N 5/37455 |
| | | | | 348/E3.018 |
| 2012/0228476 | A1* | 9/2012 | Murashima | H04N 5/374 |
| | | | | 250/208.1 |
| 2014/0354864 | A1* | 12/2014 | Onishi | H04N 5/37455 |
| | | | | 348/302 |
| 2016/0104733 | A1* | 4/2016 | Sato | H04N 5/3559 |
| | | | | 250/208.1 |
| 2016/0173796 | A1* | 6/2016 | Takado | H04N 5/3765 |
| | | | | 348/302 |

(Continued)

FOREIGN PATENT DOCUMENTS

JP    2001-16508 A    1/2001

*Primary Examiner* — Chiawei Chen
(74) *Attorney, Agent, or Firm* — Canon U.S.A., Inc. IP Division

(57) ABSTRACT

In an aspect of the present disclosure, a photoelectric conversion apparatus comprising includes a scan unit and a plurality of pixels each including a photoelectric conversion unit and configured to output a digital signal corresponding to an electric charge generated by the photoelectric conversion unit. The scan unit performs a scan to read the digital signal from the plurality of pixels and an operation of inputting a signal based on the digital signal output from the plurality of pixels to the plurality of pixels.

18 Claims, 23 Drawing Sheets

(56) References Cited

U.S. PATENT DOCUMENTS

| | | | |
|---|---|---|---|
| 2017/0176250 A1 | 6/2017 | Rae | |
| 2018/0151758 A1 | 5/2018 | Morimoto | |
| 2018/0208112 A1* | 7/2018 | Tayama | G08G 1/16 |
| 2019/0098242 A1* | 3/2019 | Mori | H04N 5/341 |
| 2019/0124285 A1* | 4/2019 | Otaka | H04N 5/35527 |
| 2019/0132539 A1* | 5/2019 | Otaka | H04N 5/378 |
| 2019/0141270 A1* | 5/2019 | Otaka | H04N 5/35527 |
| 2019/0149754 A1* | 5/2019 | Otaka | H04N 5/379 |
| | | | 348/296 |
| 2019/0273883 A1* | 9/2019 | Sakakibara | H04N 5/355 |
| 2020/0204749 A1* | 6/2020 | Mori | H01L 27/14612 |
| 2020/0228740 A1* | 7/2020 | Otaka | H04N 5/379 |
| 2020/0228745 A1* | 7/2020 | Otaka | G11C 11/419 |
| 2020/0396408 A1* | 12/2020 | Kimizuka | H01L 29/7391 |
| 2021/0067168 A1* | 3/2021 | Kitano | H04N 5/361 |

\* cited by examiner

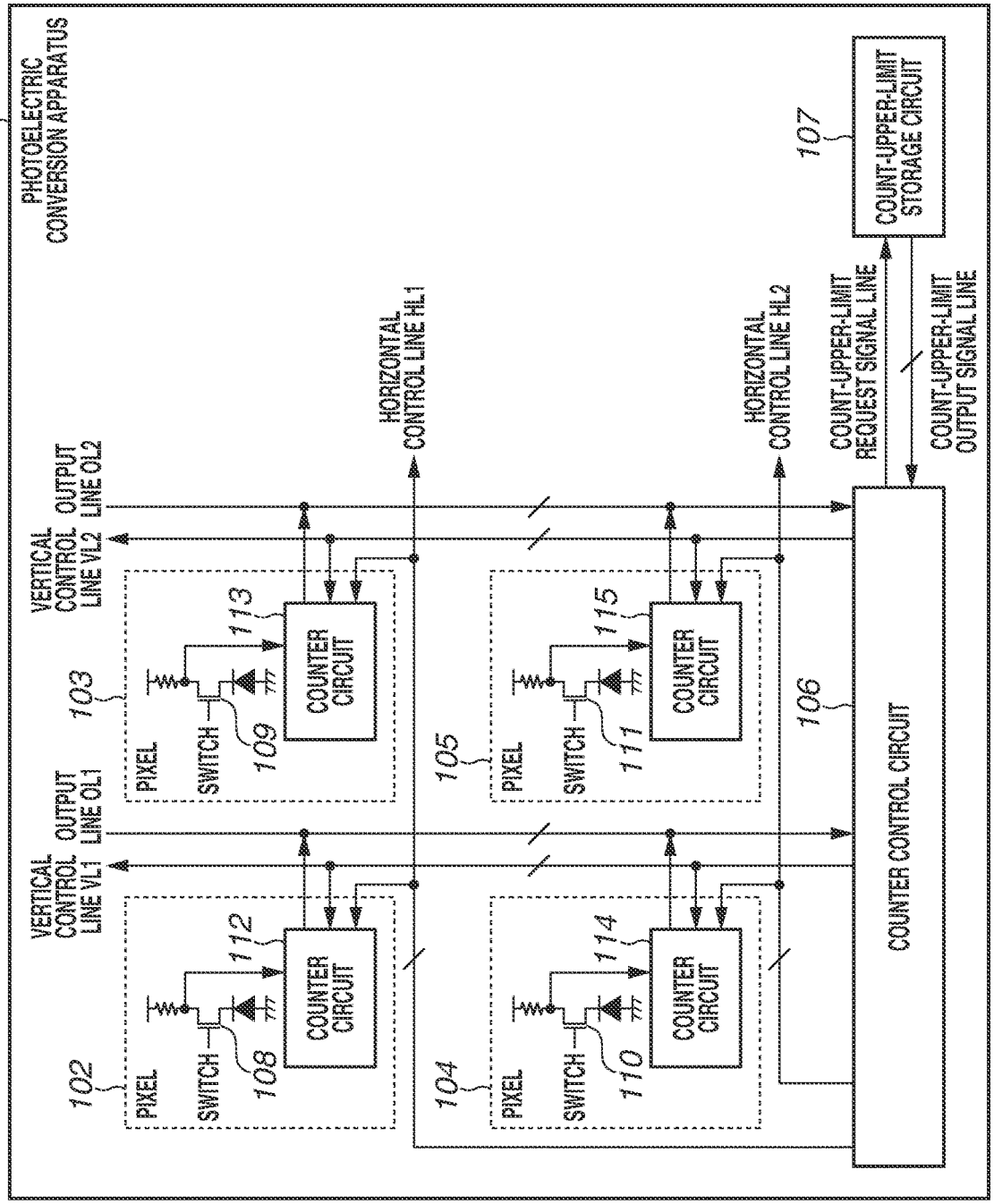

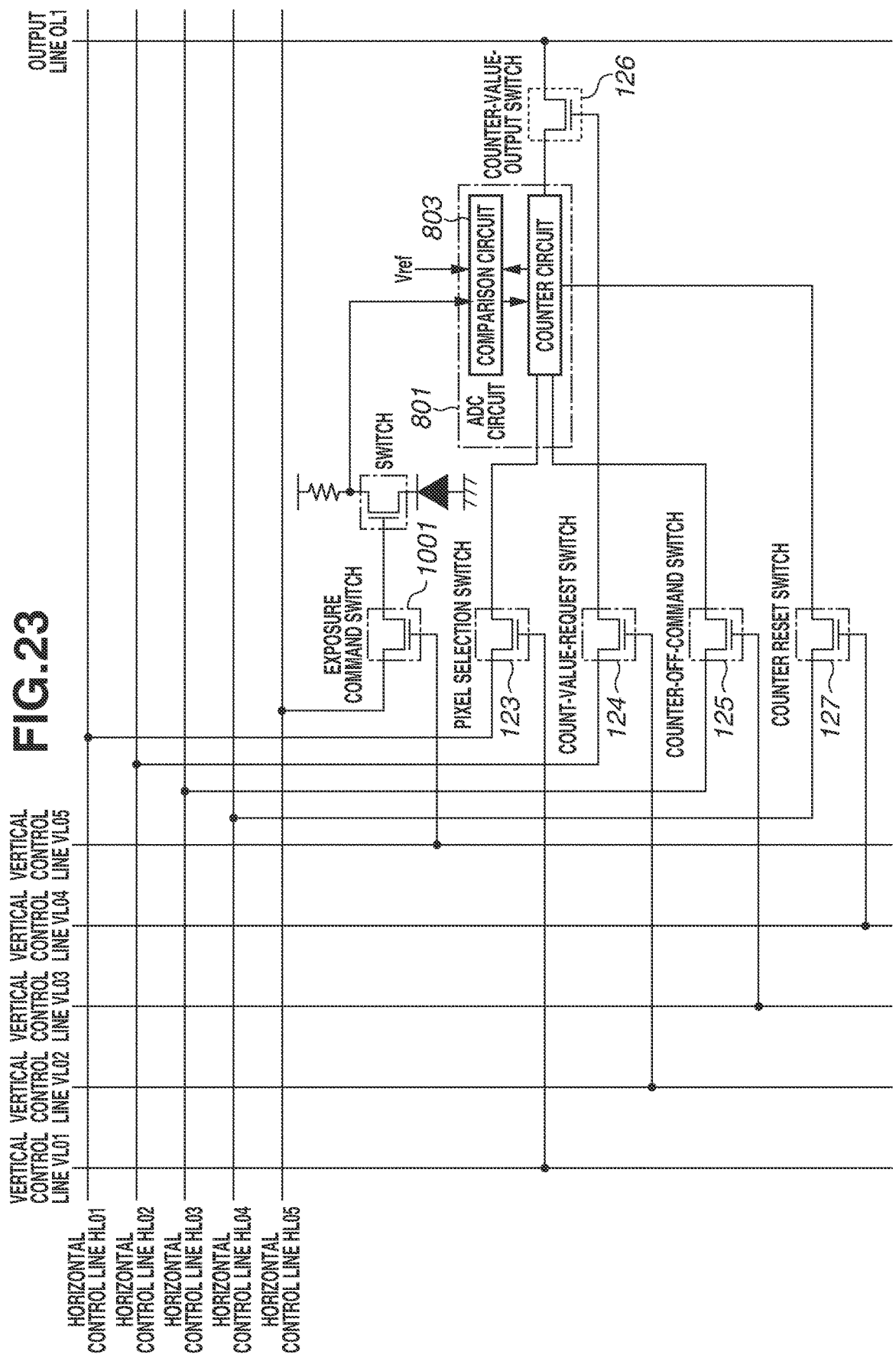

PHOTOELECTRIC CONVERSION APPARATUS, IMAGE CAPTURING SYSTEM, METHOD FOR DRIVING PHOTOELECTRIC CONVERSION APPARATUS, AND MOVING OBJECT

BACKGROUND

Field

The present disclosure relates to photoelectric conversion apparatuses, image capturing systems, methods for driving a photoelectric conversion apparatus, and moving objects.

Description of the Related Art

There is known a photoelectric conversion apparatus that outputs a pixel signal based on photoelectric conversion as a digital signal from a pixel. It is greatly advantageous to digitalize a pixel signal output from a pixel in terms of noise and signal calculation processing. United States Patent Application Publication No. 2017/0176250 discusses a photoelectric conversion apparatus that digitally counts photons incident on a photodiode. In United States Patent Application Publication No. 2017/0176250, a pixel includes a digital memory, and data for deactivating a defective pixel is written to the digital memory using row and column control lines.

The photoelectric conversion apparatus discussed in United States Patent Application Publication No. 2017/0176250 needs the row and column control lines for writing data to the digital memory of the pixel and the row and column control lines for writing a pixel signal output from the pixel. United States Patent Application Publication No. 2017/0176250 is silent about reduction of the number of wiring lines of the photoelectric conversion apparatus. In United States Patent Application Publication No. 2017/0176250, pixel signals from a plurality of pixels arranged on an array are collectively read. In other words, a case where reading of a digital signal from each pixel on the array is individually controlled is not considered in United States Patent Application Publication No. 2017/0176250.

SUMMARY

The present disclosure is directed to a photoelectric conversion apparatus that realizes both control of each of digital signal writing to and digital signal reading from a pixel and reduction of at least one of a circuit area and a wiring line area.

According to an aspect of the present disclosure, a photoelectric conversion apparatus includes a scan unit and a plurality of pixels each including a photoelectric conversion unit and configured to output a digital signal corresponding to an electric charge generated by the photoelectric conversion unit. The scan unit performs a scan to read the digital signal from the plurality of pixels and an operation of inputting a signal based on the digital signal output from the plurality of pixels to the plurality of pixels.

According to another aspect of the present disclosure, a photoelectric conversion apparatus includes a first signal input/output unit and a plurality of pixels each including a photoelectric conversion unit and a storage unit and configured to output a digital signal corresponding to an electric charge generated by the photoelectric conversion unit, and the photoelectric conversion apparatus further includes a transmission line including an electric path for transmitting the digital signal from the plurality of pixels to the first signal input/output unit and configured to transmit a predetermined digital signal from the first signal input/output unit to the plurality of pixels using the electric path.

According to another aspect of the present disclosure, a method is provided for driving a photoelectric conversion apparatus including a scan unit and a plurality of pixels each including a photoelectric conversion unit and configured to output a digital signal corresponding to an electric charge generated by the photoelectric conversion unit. The scan unit performs a scan to read the digital signal from the plurality of pixels and a scan to store a predetermined digital signal in the plurality of pixels.

Further features of the present disclosure will become apparent from the following description of exemplary embodiments with reference to the attached drawings.

BRIEF DESCRIPTION OF THE DRAWINGS

FIG. 11 illustrates a schematic configuration of a photoelectric conversion apparatus according to a seventh exemplary embodiment.

FIG. 23 illustrates a schematic configuration of a pixel according to the tenth exemplary embodiment.

DESCRIPTION OF THE EMBODIMENTS

Figure 1:
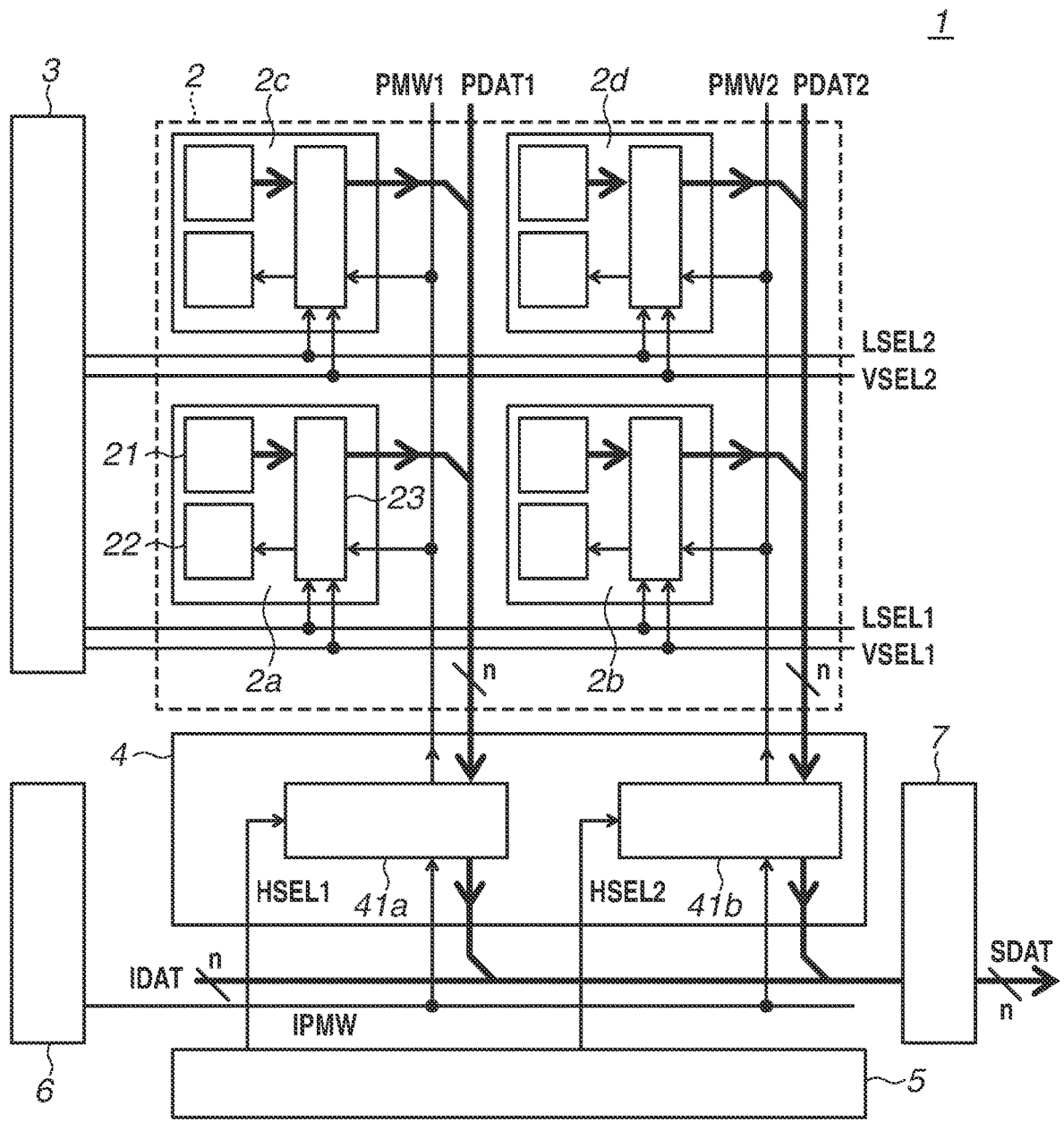
FIG. 1 is a schematic configuration diagram illustrating a photoelectric conversion apparatus according to a first exemplary embodiment.
Figure 2:
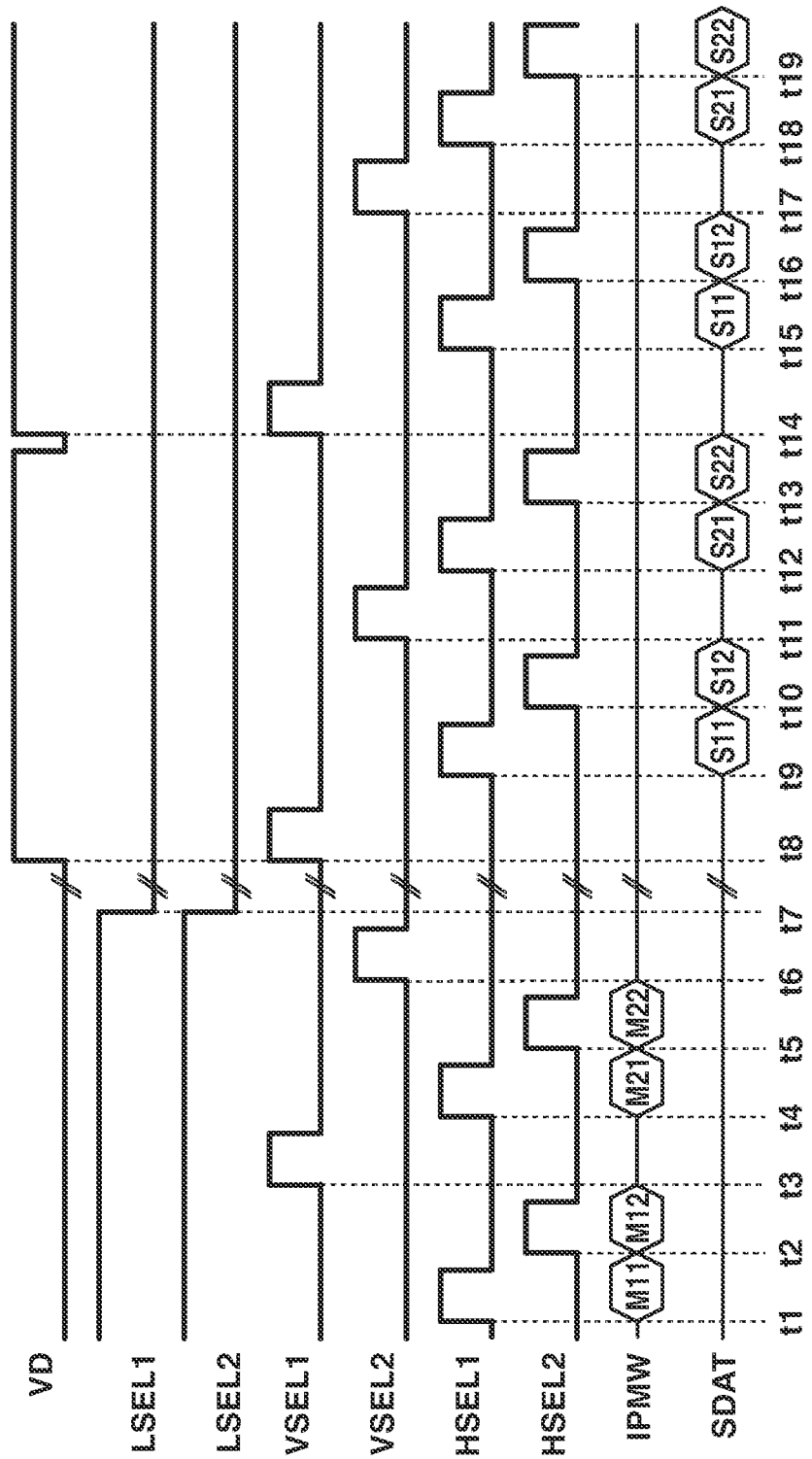
FIG. 2 is an operation timing chart illustrating the photoelectric conversion apparatus according to the first exemplary embodiment.

A first exemplary embodiment of the present disclosure will be described below. A photoelectric conversion apparatus according to the present exemplary embodiment will be described below with reference to FIGS. 1 and 2. FIG. 1 is a schematic configuration diagram illustrating the photoelectric conversion apparatus according to the present exemplary embodiment. FIG. 2 is a timing chart illustrating the driving of the photoelectric conversion apparatus according to the present exemplary embodiment.

As illustrated in FIG. 1, a photoelectric conversion apparatus 1 according to the present exemplary embodiment includes a pixel array unit 2, a vertical scan unit 3, a signal transmission/reception unit 4, a horizontal scan unit 5, a memory unit 6, and a signal output unit 7. The pixel array unit 2 includes a plurality of pixels 2a to 2d arranged two-dimensionally. FIG. 1 illustrates a case where the pixel array unit 2 includes the pixels 2a to 2d arranged in two rows and two columns. The numbers of rows and columns of the pixel array unit 2 are not particularly limited.

A transmission line PMW1 is commonly connected to the plurality of pixels 2a and 2c of the same column of the pixel array unit 2, and a transmission line PMW2 is commonly connected to the plurality of pixels 2b and 2d of the same column of the pixel array unit 2. Similarly, a transmission line PDAT1 is commonly connected with the plurality of pixels 2a and 2c of the same column of the pixel array unit 2, and a transmission line PDAT2 is commonly connected with the plurality of pixels 2b and 2d of the same column of the pixel array unit 2. The transmission lines PMW1 and PMW2 are illustrated as n bus wiring lines in FIG. 1. Similarly, the transmission lines PDAT1 and PDAT2 are illustrated as n bus wiring lines in FIG. 1.

The signal transmission/reception unit 4 includes input/output units 41a and 41b. The input/output unit 41a is connected to the transmission lines PMW1 and PDAT1. The input/output unit 41a transmits a predetermined signal to the pixels 2a and 2c via the transmission line PMW1 and receives a pixel signal output from each of the pixels 2a and 2c via the transmission line PDAT1. As used herein, the term "predetermined signal" refers to a predetermined digital signal. The predetermined digital signal is, for example, a signal for deactivating a defective pixel and activating a non-defective pixel in a case where the plurality of pixels includes the non-defective pixel and the defective pixel. As used herein, the term "pixel signal" refers to a digital signal based on light incident on a photoelectric conversion unit of each of the pixels 2a to 2d. Specifically, the pixel signal is a digital signal corresponding to an electric charge generated by the photoelectric conversion unit of each of the pixels 2a to 2d. The photoelectric conversion unit is, for example, a photodiode in a semiconductor substrate. Similarly, the input/output unit 41b is connected to the transmission lines PMW2 and PDAT2. The input/output unit 41b transmits a predetermined signal to the pixels 2b and 2d via the transmission line PMW2 and receives a pixel signal output from each of the pixels 2b and 2d via the transmission line PDAT2.

The input/output units 41a and 41b are further connected to transmission lines IPMW and IDAT. The memory unit 6 sequentially transmits a predetermined signal to the input/output units 41a and 41b via the transmission line IPMW. The signal output unit 7 receives a pixel signal output sequentially from the input/output units 41a and 41b and outputs the pixel signal as an output signal SDAT of the photoelectric conversion apparatus 1. The transmission line IDAT and the output signal SDAT are respectively illustrated as n bus wiring lines and n-bit digital signal in FIG. 1.

Column selection control lines HSEL1 and HSEL2 control reception and transmission of the input/output units 41a and 41b. The horizontal scan unit 5 feeds a control signal to the column selection control lines HSEL1 and HSEL2. With this configuration, the input/output units 41a and 41b sequentially receive a predetermined signal output from the memory unit 6 and transmit the received predetermined signal to the pixels 2a to 2d and receive a pixel signal from the pixels 2a to 2d and sequentially transmit the received pixel signal to the signal output unit 7.

In the present exemplary embodiment, predetermined signal writing to and pixel signal reading from the input/output units 41a and 41b are performed. More specifically, the input/output units 41a and 41b are used to write both a predetermined signal and a read pixel signal. For example, a digital memory of each of the input/output units 41a and 41b stores both a predetermined signal and a pixel signal. Here, if the reading of the predetermined signal and the writing of the pixel signal are performed by different input/output units, for example, a first digital memory for storing a pixel signal and a second digital memory for storing a predetermined signal are presumably needed. This requires a certain circuit area to arrange two digital memories for each input/output unit. By contrast, in the present exemplary embodiment, the digital memories of the input/output units 41a and 41b for storing the read pixel signal are also used for writing of the predetermined signal. This reduces the circuit area of the signal transmission/reception unit 4.

The pixels 2a to 2d each include an input/output unit 23 and pixel circuit units 21 and 22. The input/output units 23 of the pixels 2a and 2c are each connected to the transmission lines PMW1 and PDAT1. The input/output units 23 of the pixels 2a and 2c each receive a predetermined signal output from the input/output unit 41a via the transmission line PMW1 and transmit a pixel signal to the input/output unit 41a via the transmission line PDAT1. Similarly, the input/output units 23 of the pixels 2b and 2d are each connected to the transmission lines PMW2 and PDAT2 and receive a predetermined signal from the input/output unit 41b via the transmission line PMW2 and transmit a pixel signal to the input/output unit 41b via the transmission line PDAT2. Furthermore, the input/output units 23 of the pixels 2a and 2b are each connected to control lines LSEL1 and VSEL1, and the input/output units 23 of the pixels 2c and 2d are each connected to control lines LSEL2 and VSEL2. Each output unit 23 controls signal transmission and reception based on a control signal fed from the vertical scan unit 3 via the control lines LSEL1, LSEL2, VSEL1, and VSEL2. The pixel circuit unit 21 outputs a pixel signal to the input/output unit 23. The pixel circuit unit 21 is, for example, an analog to digital conversion circuit configured to convert a signal that is photoelectrically converted by the photoelectric conversion unit into a digital signal. Alternatively, the pixel circuit unit 21 can be a counter circuit configured to count incident photons detected by the photoelectric conversion unit and output a result thereof. In the latter case, for example, an avalanche diode is used as a photoelectric conversion unit. The respective pixel circuit units 22 are configured to control an operation of the corresponding pixel based on a predetermined signal from the input/output units 23. The pixel circuit unit 22 is, for example, a storage unit that stores a predetermined signal and a control circuit that activates or deactivates an operation of the pixel circuit unit 21. For example, in a case where an avalanche diode is used as a photoelectric conversion unit, the pixel circuit unit 21 generally includes the avalanche diode, a waveform shaping circuit, and a counter. The waveform shaping circuit shapes a waveform output from the avalanche diode into a pulse wave. The counter counts pulses output from the waveform shaping circuit. The "predetermined digital signal" is a signal for performing at least one of control for stopping avalanche multiplication, control for stopping the waveform shaping circuit, control for stopping the counter, and control for stopping digital signal output from the counter to the transmission line PDAT1.

Operations of the photoelectric conversion apparatus 1 in FIG. 1 will be described below with reference to a timing chart in FIG. 2.

FIG. 2 illustrates timings of signals fed to the control lines LSEL1, LSEL2, VSEL1, and VSEL2 by the vertical scan unit 3. FIG. 2 further illustrates timings of signals fed to the column selection control lines HSEL1 and HSEL2 by the horizontal scan unit 5, the transmission line IPMW, the output signal SDAT, and a vertical scan synchronization signal VD. If the vertical scan synchronization signal VD is turned on, a vertical scan is started from a row of pixels to be read first. Then, the next time the vertical scan synchronization signal VD is turned on, a vertical scan is started from the row of the pixels to be read first again. In FIG. 2, the vertical scan synchronization signal VD is set at a high-level throughout a period during which the vertical scan unit 3 scans the pixels of each row. Alternatively, the vertical scan synchronization signal VD can be changed to a low-level after being maintained at the high-level during a period corresponding to a predetermined period of a clock pulse from the time of the change of the vertical scan synchronization signal VD to the high-level. Even in such a case, the vertical scan synchronization signal VD is used as a trigger signal for starting a scan by the vertical scan unit 3.

In FIG. 2, at time t1, data M11 is transmitted from the memory unit 6 to the transmission line IPMW and the column selection control line HSEL1 is changed to the high-level, and then the input/output unit 41a stores the data M11. Here, the term "data" is used as a word expressing a predetermined digital signal that is written to the pixels 2a to 2d. Similarly, at time t2, data M12 is transmitted from the memory unit 6 to the transmission line IPMW and the column selection control line HSEL2 is changed to the high-level, and then the input/output unit 41b stores the data M12. At time t3, the control line VSEL1 is changed to the high-level, and the input/output unit 23 of the pixel 2a receives the data M11 via the transmission line PMW1 and outputs the data M11 to the pixel circuit unit 22. At the same time, similarly, the input/output unit 23 of the pixel 2b receives the data M12 via the transmission line PMW2 and outputs the data M12 to the pixel circuit unit 22. At this time, the control line LSEL1 is set at the high-level. Next, at time t4, data M21 is transmitted from the memory unit 6 to the transmission line IPMW and the column selection control line HSEL1 is changed to the high-level, and then the input/output unit 41a stores the data M21. Similarly, at time t5, data M22 is transmitted from the memory unit 6 to the transmission line IPMW and the column selection control line HSEL2 is changed to the high-level, and then the input/output unit 41b stores the data M22. At time t6, the control line VSEL2 is changed to the high-level, and the input/output unit 23 of the pixel 2c receives the data M21 via the transmission line PMW1 and outputs the data M21 to the pixel circuit unit 22. At the same time, similarly, the input/output unit 23 of the pixel 2d receives the data M22 via the transmission line PMW2 and outputs the data M22 to the pixel circuit unit 22. At this time, the control line LSEL2 is at the high-level.

At this time, the pixels 2a, 2b, 2c, and 2d have respectively received the data M11, M12, M21, and M22 as predetermined signals. Thus, the pixels 2a, 2b, 2c, and 2d are individually controlled by the respective predetermined signals received by the pixel circuit units 22.

At time t7, the control lines LSEL1 and LSEL2 are changed to the low-level, and at time t8, the vertical scan synchronization signal VD is changed to the high-level, and then the operation of the photoelectric conversion apparatus 1 proceeds to an operation of outputting a pixel signal based on photoelectric conversion. At time t8, the control line VSEL1 is changed to the high-level, and the input/output units 23 of the pixels 2a and 2b each output a pixel signal to the transmission lines PDAT1 and PDAT2. At the same time, the signal transmission/reception unit 4 stores the pixel signals output from the pixels 2a and 2b in the input/output units 41a and 41b, respectively. At time t9, the column selection control line HSEL1 is changed to the high-level, and the signal transmission/reception unit 4 outputs a signal based on the pixel signal from the pixel 2a, from the input/output unit 41a to the transmission line IDAT. At this time, the signal based on the pixel signal from the pixel 2a is output as an output signal S11 of the photoelectric conversion apparatus 1 from the signal output unit 7. At time t10, the column selection control line HSEL2 is changed to the high-level, and the signal transmission/reception unit 4 outputs a signal based on the pixel signal from the pixel 2b, from the input/output unit 41b to the transmission line IDAT. At this time, the signal based on the pixel signal from the pixel 2b is output as an output signal S12 of the photoelectric conversion apparatus 1 from the signal output unit 7. Next, at time t11, the control line VSEL2 is changed to the high-level, and, similarly, the pixel signals from the pixels 2c and 2d are respectively stored in the input/output units 41a and 41b of the signal transmission/reception unit 4. Furthermore, at time t12, the column selection control line HSEL1 is changed to the high-level and, similarly, a signal based on the pixel signal from the pixel 2c is output as an output signal S21 of the photoelectric conversion apparatus 1 from the signal output unit 7. At time t13, the column selection control line HSEL2 is changed to the high-level and, similarly, a signal based on the pixel signal from the pixel 2d is output as an output signal S22 of the photoelectric conversion apparatus 1 from the signal output unit 7. Thereafter, the vertical scan synchronization signal VD is changed to the low-level. At time t14, the vertical scan synchronization signal VD is changed to the high-level again, and the photoelectric conversion apparatus 1 repeats an operation of outputting a pixel signal based on photoelectric conversion.

In FIG. 1, the plurality of pixels 2a to 2d is arranged in a matrix form, and the vertical scan unit 3 and the horizontal scan unit 5 control signal writing and reading to and from the pixels 2a to 2d. The present exemplary embodiment is not limited to the above-described configuration and also encompasses a configuration where a plurality of pixels is arranged in a row or column direction and one of a horizontal scan unit and a vertical scan unit controls writing to and reading from the pixels. In such a case, the horizontal scan unit or the vertical scan unit corresponds to a scan unit.

While predetermined signal writing to and pixel signal reading from each pixel are controlled in the present exemplary embodiment, predetermined signal writing to and pixel signal reading from two or more pixels can be controlled collectively. More specifically, writing to and reading from a first pixel group including two or more pixels of a pixel array are controlled, and writing to and reading from a second pixel group including other two or more pixels of the pixel array are controlled.

As described above, the photoelectric conversion apparatus 1 according to the present exemplary embodiment controls digital signal writing to and digital signal reading from the pixels 2a to 2d using the vertical scan unit 3 and the horizontal scan unit 5. United States Patent Application Publication No. 2017/0176250 discusses signal writing to a pixel but is silent about a case where a pixel signal is individually read. To read a pixel signal individually in United States Patent Application Publication No. 2017/0176250, a vertical scan circuit and a horizontal scan circuit for writing and another vertical scan circuit and another horizontal scan circuit for reading are needed. Thus, a circuit area is needed to arrange a vertical scan circuit and a horizontal scan circuit for writing and another vertical scan circuit and another horizontal scan circuit for reading. By contrast, in the present exemplary embodiment, the vertical scan unit 3 and the horizontal scan unit 5 control writing and reading. In other words, the vertical scan unit 3 and the horizontal scan unit 5 are commonly used for predetermined signal transmission and control of pixel signal transmission. This reduces the circuit area compared with a configuration that includes a vertical scan circuit and a horizontal scan circuit for writing and another vertical scan circuit and another horizontal scan circuit for reading. The input/output units 41a and 41b transmit a predetermined signal to the input/output units 23 of the pixels 2a to 2d, so that digital signal writing to the pixels 2a to 2d and pixel signal reading from the pixels 2a to 2d are both controlled.

Other examples of digital signals to be written to the pixels 2a to 2d include an analog to digital (AD) conversion gain setting, an amplification rate setting in a case where an analog signal amplification unit based on incident light is provided, and a control signal for reducing the consumption of electric currents in the pixels 2a to 2d of a non-scan row. As described above, various signals are applicable to digital signals to be written to the pixels 2a to 2d that are described in the present exemplary embodiment.

With the photoelectric conversion apparatus 1 according to the present exemplary embodiment, control of digital signal writing to the pixels 2a to 2d and pixel signal reading from the pixels 2a to 2d and circuit area reduction are realized as described above.

Figure 3:
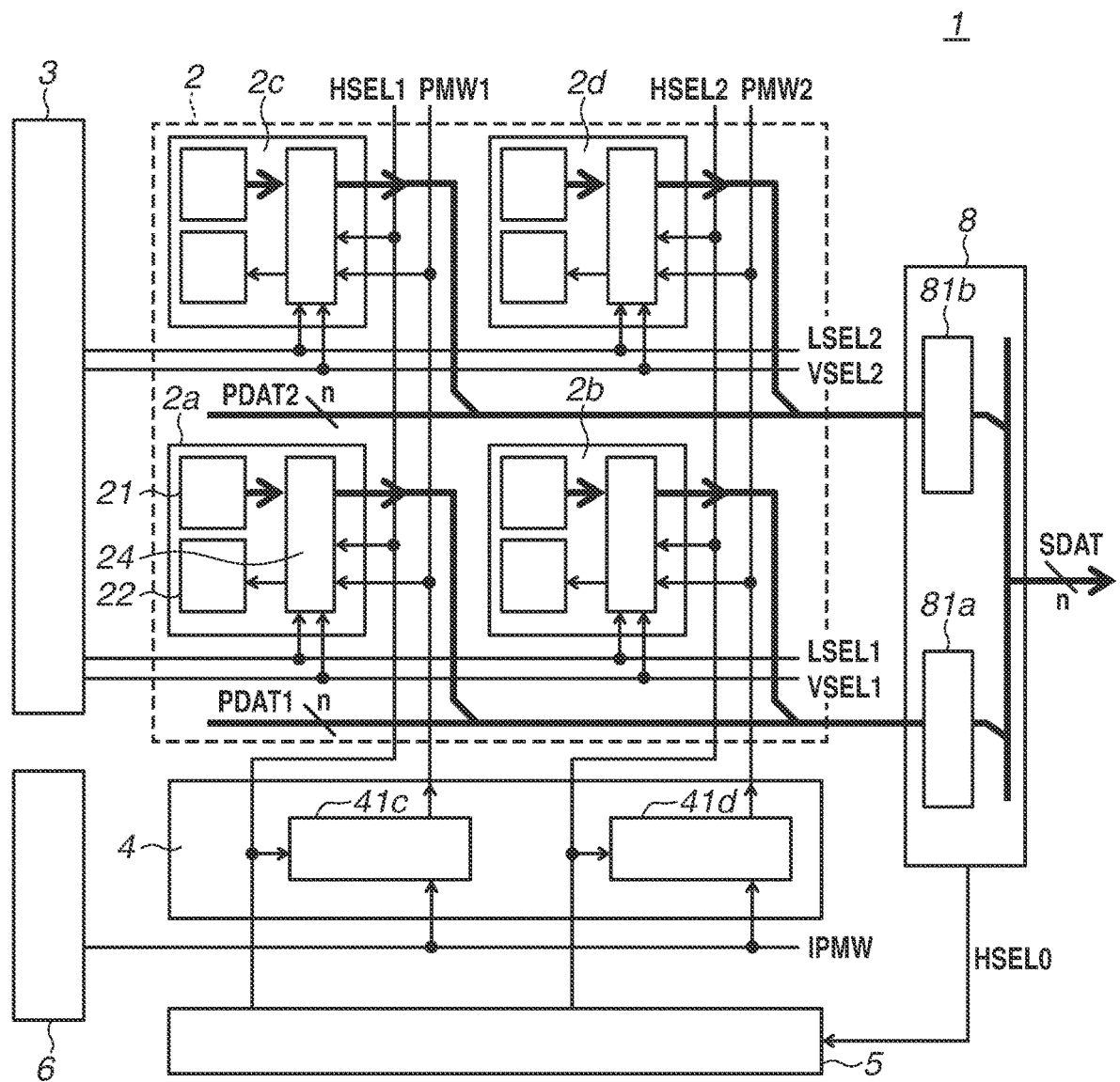
FIG. 3 is a schematic configuration diagram illustrating a photoelectric conversion apparatus according to a second exemplary embodiment.
Figure 4:
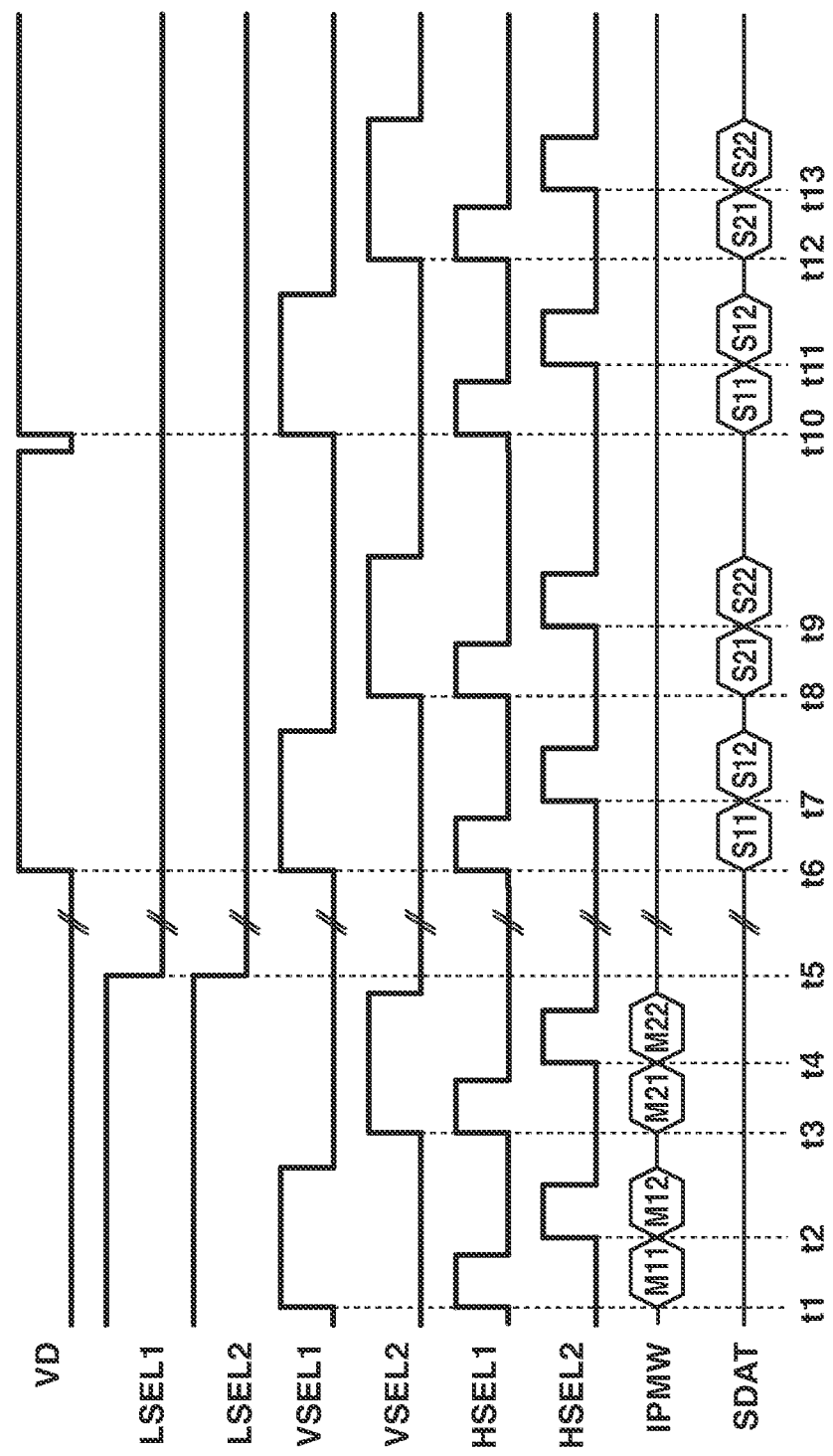
FIG. 4 is an operation timing chart illustrating the photoelectric conversion apparatus according to the second exemplary embodiment.

A second exemplary embodiment of the present disclosure will be described below. A photoelectric conversion apparatus according to the present exemplary embodiment will be described below with reference to FIGS. 3 and 4. FIG. 3 is a schematic configuration diagram illustrating the photoelectric conversion apparatus according to the present exemplary embodiment. FIG. 4 is a timing chart illustrating the driving of the photoelectric conversion apparatus according to the present exemplary embodiment.

The photoelectric conversion apparatus according to the present exemplary embodiment is different from the first exemplary embodiment in that, in the present exemplary embodiment, the transmission lines PMW1 and PMW2 and the transmission lines PDAT1 and PDAT2 connect to different circuits, input/output units 41c and 41d and input/output units 81a and 81b, respectively. In the present exemplary embodiment, while the inclusion of a signal output unit 8 including the input/output units 81a and 81b increases the circuit area compared to the first exemplary embodiment, the advantage of circuit area reduction by the shared use of the vertical scan unit 3 and the horizontal scan unit 5 is still produced. Moreover, signal reading is performed faster than the first exemplary embodiment. Each component similar to that of the photoelectric conversion apparatus 1 according to the first exemplary embodiment is given the same reference numeral, and descriptions thereof are omitted or simplified.

As illustrated in FIG. 3, the photoelectric conversion apparatus 1 according to the present exemplary embodiment includes the pixel array unit 2, the vertical scan unit 3, the signal transmission/reception unit 4, the horizontal scan unit 5, the memory unit 6, and the signal output unit 8. The pixel array unit 2 includes the plurality of pixels 2a to 2d.

The transmission line PMW1 is commonly connected to the pixels 2a and 2c of the same column of the pixel array unit 2, and the transmission line PMW2 is commonly connected to the pixels 2b and 2d of the same column of the pixel array unit 2. The transmission line PDAT1 is commonly connected to the pixels 2a and 2b of the same row of the pixel array unit 2, and the transmission line PDAT2 is commonly connected to the pixels 2c and 2d of the same row of the pixel array unit 2. The signal transmission/reception unit 4 includes the input/output units 41c and 41d. The input/output unit 41c is connected to the transmission line PMW1 and transmits a predetermined signal to the pixels 2a and 2c via the transmission line PMW1. Similarly, the input/output unit 41d is connected to the transmission line PMW2 and transmits a predetermined signal to the pixels 2b and 2d via the transmission line PMW2. The input/output units 41c and 41d are further connected to the transmission line IPMW. The memory unit 6 sequentially transmits a predetermined signal to the input/output units 41c and 41d via the transmission line IPMW.

The signal output unit 8 includes the input/output units 81a and 81b. The input/output unit 81a is connected to the transmission line PDAT1 and receives a pixel signal from each of the pixels 2a and 2b via the transmission line PDAT1. Similarly, the input/output unit 81b is connected to the transmission line PDAT2 and receives a pixel signal from each of the pixels 2c and 2d via the transmission line PDAT2. The input/output units 81a and 81b are connected to a transmission line SDAT. The signal output unit 8 sequentially outputs a pixel signal received by each of the input/output units 81a and 81b as the output signal SDAT of the photoelectric conversion apparatus 1.

The pixels 2a to 2d each include an input/output unit 24 and the pixel circuit units 21 and 22. The horizontal scan unit 5 feeds a control signal to the column selection control lines HSEL1 and HSEL2 to enable predetermined signal transmission/reception and pixel signal transmission. The signal output unit 8 synchronizes with the horizontal scan unit 5 using a control line HSEL0.

With this configuration, the input/output units 41c and 41d sequentially receive a predetermined signal output from the memory unit 6 and transmit the predetermined signal to each of the pixels 2a to 2d. The input/output units 81a and 81b receive a pixel signal from the pixels 2a to 2d and sequentially output the pixel signal as the output signal SDAT of the photoelectric conversion apparatus 1 by an action of the signal output unit 8.

Operations of the photoelectric conversion apparatus 1 in FIG. 3 will be described below with reference to a timing chart in FIG. 4.

FIG. 4 illustrates signals fed to the control lines LSEL1, LSEL2, VSEL1, and VSEL2 by the vertical scan unit 3 and signals fed to the column selection control lines HSEL1 and HSEL2 by the horizontal scan unit 5, the transmission line IPMW, the output signal SDAT, and the vertical scan synchronization signal VD.

In FIG. 4, at time t1, the data M11 is transmitted from the memory unit 6 to the transmission line IPMW and the control line VSEL1 and the column selection control line HSEL1 are changed to the high-level, and then the input/output unit 41c stores the data M11. At the same time, the input/output unit 24 of the pixel 2a receives the data M11 via the transmission line PMW1 and outputs the data M11 to the pixel circuit unit 22. At time t2, the data M12 is transmitted from the memory unit 6 to the transmission line IPMW and the column selection control line HSEL2 is changed to the high-level, and then the input/output unit 41d stores the data M12. At the same time, the input/output unit 24 of the pixel 2b receives the data M12 via the transmission line PMW2 and outputs the data M12 to the pixel circuit unit 22. At this time, the control line LSEL1 is at the high-level. After the control line VSEL1 is changed to the low-level, at time t3, the data M21 is transmitted from the memory unit 6 to the transmission line IPMW and the control line VSEL2 and the column selection control line HSEL1 are changed to the high-level, and then the input/output unit 41c stores the data M21. At the same time, the input/output unit 24 of the pixel 2c receives the data M21 via the transmission line PMW1 and outputs the data M21 to the pixel circuit unit 22. At time t4, the data M22 is transmitted from the memory unit 6 to the transmission line IPMW and the column selection control line HSEL2 is changed to the high-level, and then the input/output unit 41d stores the data M22. At the same time, the input/output unit 24 of the pixel 2d receives the data M22 via the transmission line PMW2 and outputs the data M22 to the pixel circuit unit 22. At this time, the control line LSEL2 is at the high-level.

At this time point, the pixels 2a, 2b, 2c and 2d have respectively received the data M11, M12, M21 and M22 as predetermined signals. Thus, the pixels 2a, 2b, 2c and 2d are each controlled based on the predetermined signals received by the pixel circuit units 22. At time t5, the control lines LSEL1 and LSEL2 are changed to the low-level, and at time t6, the vertical scan synchronization signal VD is changed to the high-level, and then the photoelectric conversion apparatus 1 changes to an operation of outputting a pixel signal based on photoelectric conversion. At time t6, the control line VSEL1 and the column selection control line HSEL1 are changed to the high-level, and then the input/output unit 24 of the pixel 2a outputs a pixel signal to the input/output unit 81a. At this time, a signal based on the pixel signal from the pixel 2a is output as the output signal S11 of the photoelectric conversion apparatus 1 from the signal output unit 8. At time t7, the column selection control line HSEL2 is changed to the high-level, and then the input/output unit 24 of the pixel 2b outputs a pixel signal to the input/output unit 81a. At this time, a signal based on the pixel signal from the pixel 2b is output as the output signal S12 of the photoelectric conversion apparatus 1 from the signal output unit 8. Next, after the control line VSEL1 is changed to the low-level, at time t8, the control line VSEL2 and the column selection control line HSEL1 are changed to the high-level, and then the input/output unit 24 of the pixel 2c outputs a pixel signal to the input/output unit 81b. At this time, a signal based on the pixel signal from the pixel 2c is output as the output signal S21 of the photoelectric conversion apparatus 1 from the signal output unit 8. At time t9, the column selection control line HSEL2 is changed to the high-level, and then the input/output unit 24 of the pixel 2d outputs a pixel signal to the input/output unit 81b. At this time, a signal based on the pixel signal from the pixel 2d is output as the output signal S22 of the photoelectric conversion apparatus 1 from the signal output unit 8. Thereafter, the vertical scan synchronization signal VD is changed to the low-level, and at time t11, the vertical scan synchronization signal VD is changed to the high-level again, and then the photoelectric conversion apparatus 1 repeats an operation of outputting a pixel signal based on photoelectric conversion.

As described above, the input/output units 41c and 41d transmit a predetermined signal to the input/output units 24 of the pixels 2a to 2d in the photoelectric conversion apparatus 1 according to the present exemplary embodiment so that predetermined signal writing to each pixel and pixel signal reading from each pixel are both controlled. At this time, the horizontal scan unit 5 and the vertical scan unit 3 control selection of signal transmission to each of the pixels 2a to 2d. In other words, the vertical scan unit 3 and the horizontal scan unit 5 are commonly used to control both predetermined signal transmission and pixel signal transmission. With the above-described configuration, the photoelectric conversion apparatus 1 according to the present exemplary embodiment realizes both control of predetermined signal writing to and pixel signal reading from the pixels 2a to 2d and circuit area reduction. Furthermore, the transmission line PDAT1 is commonly connected to the plurality of pixels 2a and 2b of the same row of the pixel array unit 2, and the transmission line PDAT2 is commonly connected to the plurality of pixels 2c and 2d of the same row of the pixel array unit 2, and the signal output unit 8 includes the input/output units 81a and 81b. Thus, the photoelectric conversion apparatus 1 according to the present exemplary embodiment realizes faster pixel signal reading than the photoelectric conversion apparatus 1 according to the first exemplary embodiment.

Figure 5:
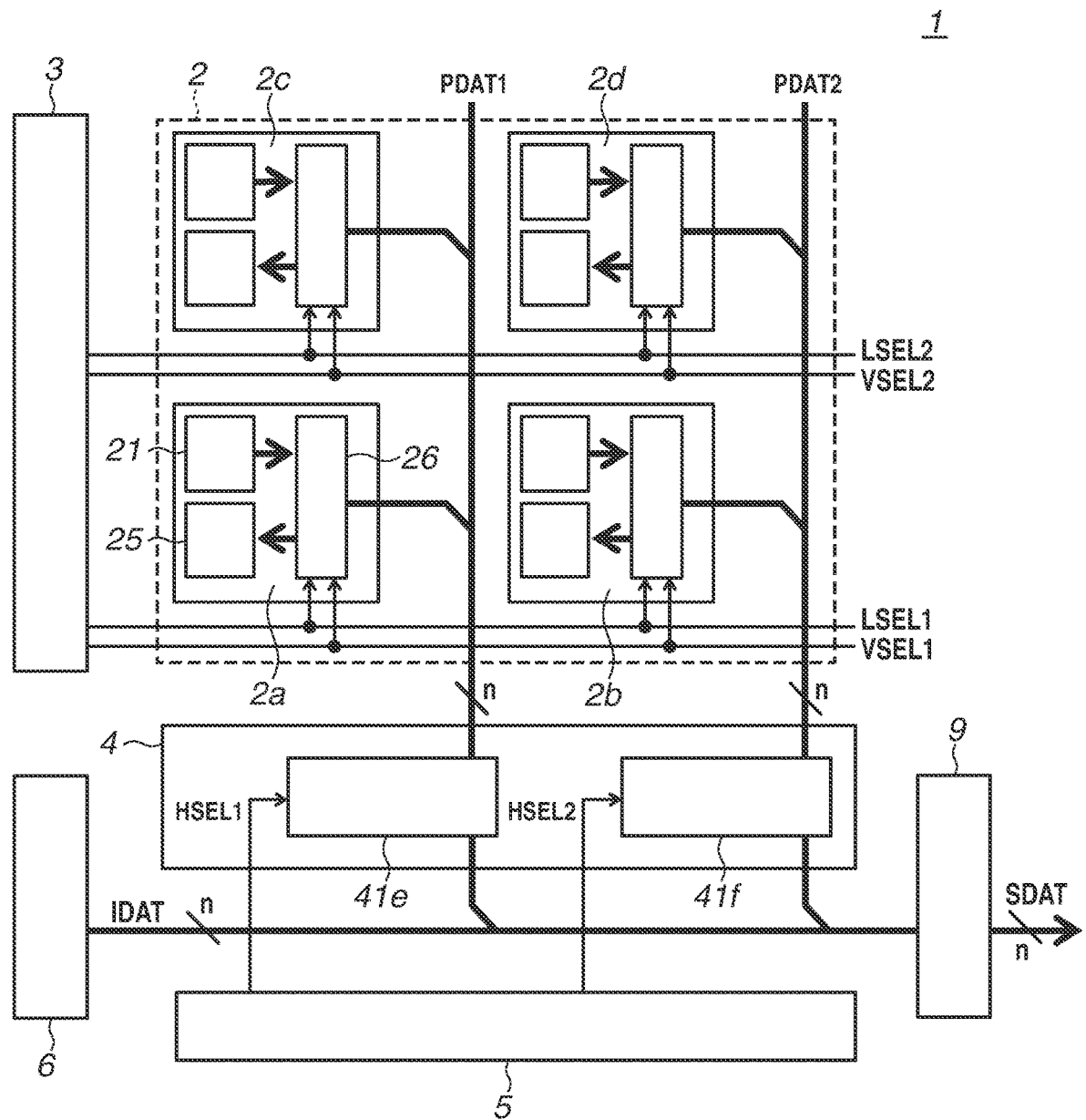
FIG. 5 is a schematic configuration diagram illustrating a photoelectric conversion apparatus according to a third exemplary embodiment.
Figure 6:
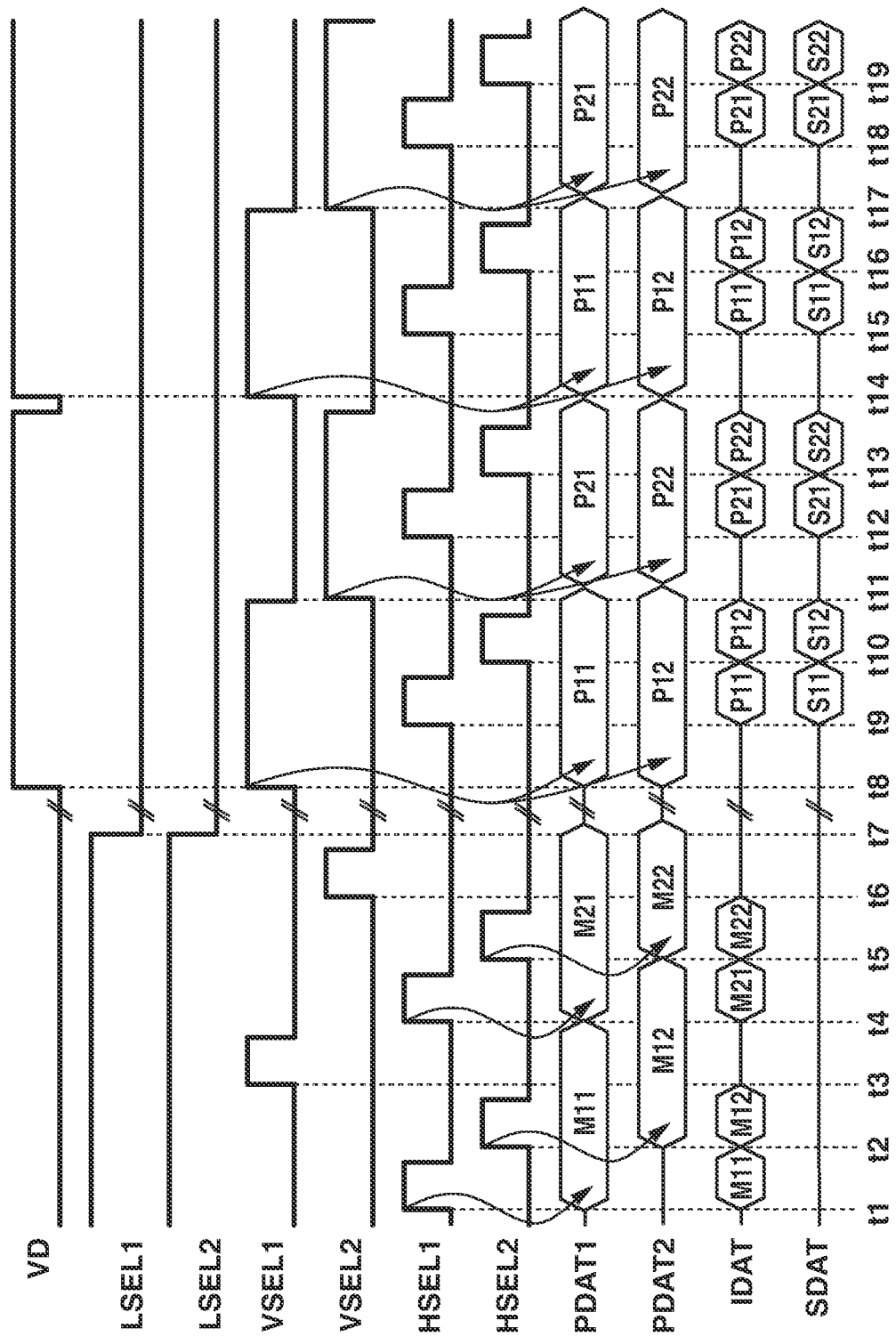
FIG. 6 is an operation timing chart illustrating the photoelectric conversion apparatus according to the third exemplary embodiment.

A third exemplary embodiment of the present disclosure will be described below. A photoelectric conversion apparatus according to the present exemplary embodiment will be described below with reference to FIGS. 5 and 6. FIG. 5 is a schematic configuration diagram illustrating the photoelectric conversion apparatus according to the present exemplary embodiment. FIG. 6 is a timing chart illustrating the driving of the photoelectric conversion apparatus according to the present exemplary embodiment.

The photoelectric conversion apparatus 1 according to the present exemplary embodiment is different from the first exemplary embodiment in that, in the present exemplary embodiment, the transmission lines PDAT1 and PDAT2 are used as a transmission unit from the pixels 2a to 2d to input/output units 41e and 41f and also as a transmission unit from the input/output units 41e and 41f to the pixels 2a to 2d.

In other words, unlike the first exemplary embodiment, the transmission lines PDAT1 and PDAT2 are bi-directional signal lines in the present exemplary embodiment. Moreover, unlike the first exemplary embodiment, the transmission line IDAT is used for both predetermined signal transmission from the memory unit 6 and pixel signal transmission from the pixels 2a to 2d in the photoelectric conversion apparatus 1 according to the present exemplary embodiment. Each component similar to that of the photoelectric conversion apparatus 1 according to the first exemplary embodiment is given the same reference numeral, and descriptions thereof are omitted or simplified.

As illustrated in FIG. 5, the photoelectric conversion apparatus 1 according to the present exemplary embodiment includes the pixel array unit 2, the vertical scan unit 3, the signal transmission/reception unit 4, the horizontal scan unit 5, the memory unit 6, and a signal output unit 9. The pixel array unit 2 includes the plurality of pixels 2a to 2d.

The input/output unit 41e is connected to the transmission line PDAT1. The input/output unit 41e transmits a predetermined signal to the pixels 2a and 2c and receives a pixel signal from the pixels 2a and 2c via the transmission line PDAT1. Similarly, the input/output unit 41f is connected to the transmission line PDAT2. The input/output unit 41f transmits a predetermined signal to the pixels 2b and 2d and receives a pixel signal from the pixels 2b and 2d via the transmission line PDAT2. The input/output units 41e and 41f are further connected to the transmission line IDAT. The memory unit 6 sequentially transmits a predetermined signal to the input/output units 41e and 41f via the transmission line IDAT.

The transmission line IDAT is used for both predetermined signal transmission from the memory unit 6 and signal transmission from the pixels 2a to 2d. In other words, a signal from the pixels 2a to 2d is transmitted using an electric path for predetermined signal transmission. This reduces the number of transmission lines compared to the first exemplary embodiment, so that the area of the photoelectric conversion apparatus 1 is further reduced.

The signal output unit 9 receives a pixel signal sequentially output from the input/output units 41e and 41f and outputs the pixel signal as the output signal SDAT of the photoelectric conversion apparatus 1.

The pixels 2a to 2d each include an input/output unit 26 and the pixel circuit units 21 and 25. The input/output units 26 of the pixels 2a and 2c are connected to the transmission line PDAT1. Predetermined signal reception from the input/output unit 41e and pixel signal transmission to the input/output unit 41e are performed via the transmission line PDAT1. Similarly, the input/output units 26 of the pixels 2b and 2d are connected to the transmission line PDAT2. Predetermined signal reception from the input/output unit 41f and pixel signal transmission to the input/output unit 41f are performed via the transmission line PDAT2.

Operations of the photoelectric conversion apparatus 1 in FIG. 5 will be described below with reference to a timing chart in FIG. 6.

FIG. 6 illustrates data about signals fed to the control lines LSEL1, LSEL2, VSEL1, and VSEL2 by the vertical scan unit 3. FIG. 6 further illustrates data about signals fed to the column selection control lines HSEL1 and HSEL2 by the horizontal scan unit 5, the transmission lines PDAT1, PDAT2, and IDAT, the output signal SDAT, and the vertical scan synchronization signal VD.

In FIG. 6, at time t1, the data M11 is transmitted from the memory unit 6 to the transmission line IDAT and the column selection control line HSEL1 is changed to the high-level, and then the input/output unit 41e stores the data M11. At the same time, the input/output unit 41e transmits the data M11 to the transmission line PDAT1. Similarly, at time t2, the data M12 is transmitted from the memory unit 6 to the transmission line IDAT and the column selection control line HSEL2 is changed to the high-level, and then the input/output unit 41f stores the data M12. At the same time, the input/output unit 41f transmits the data M12 to the transmission line PDAT2. At time t3, the control line VSEL1 is changed to the high-level, and then the input/output unit 26 of the pixel 2a receives the data M11 via the transmission line PDAT1 and outputs the data M11 to the pixel circuit unit 25. At the same time, similarly, the input/output unit 26 of the pixel 2b receives the data M12 via the transmission line PDAT2 and outputs the data M12 to the pixel circuit unit 25. At this time, the control line LSEL1 is at the high-level. Next, at time t4, the data M21 is transmitted from the memory unit 6 to the transmission line IDAT and the column selection control line HSEL1 is changed to the high-level, and then the input/output unit 41e stores the data M21. At the same time, the input/output unit 41e transmits the data M21 to the transmission line PDAT1. Similarly, at time t5, the data M22 is transmitted from the memory unit 6 to the transmission line IDAT and the column selection control line HSEL2 is changed to the high-level, and then the input/output unit 41b stores the data M22. At the same time, the input/output unit 41f transmits the data M22 to the transmission line PDAT2. At time t6, the control line VSEL2 is changed to the high-level, and then the input/output unit 26 of the pixel 2c receives the data M21 via the transmission line PDAT1 and outputs the data M21 to the pixel circuit unit 25. At the same time, similarly, the input/output unit 26 of the pixel 2d receives the data M22 via the transmission line PDAT2 and outputs the data M22 to the pixel circuit unit 25. At this time, the control line LSEL2 is at the high-level.

At this time point, the pixels 2a, 2b, 2c and 2d have respectively received the data M11, M12, M21 and M22 as predetermined signals. Thus, the pixels 2a, 2b, 2c and 2d are respectively controlled based on the predetermined signals received by the pixel circuit units 25.

At time t7, the control lines LSEL1 and LSEL2 are changed to the low-level, and at time t8, the vertical scan synchronization signal VD is changed to the high-level, and then the photoelectric conversion apparatus 1 changes to an operation of outputting a pixel signal based on photoelectric conversion. At time t8, the control line VSEL1 is changed to the high-level, and then the input/output units 26 of the pixels 2a and 2b respectively output pixel signals P11 and P12 to the transmission lines PDAT1 and PDAT2. At the same time, the signal transmission/reception unit 4 stores the pixel signal P11 output from the pixel 2a in the input/output unit 41e and stores the pixel signal P12 output from the pixel 2b in the input/output unit 41f. At time t9, the column selection control line HSEL1 is changed to the high-level, and then the signal transmission/reception unit 4 outputs a signal based on the pixel signal P11 from the pixel 2a from the input/output unit 41e to the transmission line IDAT. At this time, the signal based on the pixel signal P11 from the pixel 2a is output as the output signal S11 of the photoelectric conversion apparatus 1 from the signal output unit 9. At time t10, the column selection control line HSEL2 is changed to the high-level, and then the signal transmission/reception unit 4 outputs a signal based on the pixel signal P12 from the pixel 2b from the input/output unit 41f to the transmission line IDAT. At this time, the signal based on the pixel signal P12 from the pixel 2b is output as the output signal S12 of the photoelectric conversion apparatus 1 from the signal output unit 9. Next, at time t11, the control line VSEL2 is changed to the high-level, and then, similarly, pixel signals P21 and P22 from the pixels 2c and 2d are respectively stored in the input/output units 41e and 41f of the signal transmission/reception unit 4. At time t12, the column selection control line HSEL1 is changed to the high-level, and then, similarly, a signal based on the pixel signal P21 from the pixel 2c is output as the output signal S21 of the photoelectric conversion apparatus 1 from the signal output unit 9. At time t13, the column selection control line HSEL2 is changed to the high-level, and then, similarly, a signal based on the pixel signal P22 from the pixel 2d is output as the output signal S22 of the photoelectric conversion apparatus 1 from the signal output unit 9. Thereafter, the vertical scan synchronization signal VD is changed to the low-level, and at time t14, the vertical scan synchronization signal VD is changed to the high-level again, and then the photoelectric conversion apparatus 1 repeats an operation of outputting a pixel signal based on photoelectric conversion.

As described above, the input/output units 41e and 41f transmit a predetermined signal to each of the input/output units 26 of the pixels 2a to 2d in the photoelectric conversion apparatus 1 according to the present exemplary embodiment, so that predetermined digital signal writing to the pixels 2a to 2d and pixel signal reading from the pixels 2a to 2d are both controlled. At this time, the horizontal scan unit 5 and the vertical scan unit 3 control selection of signal transmission to the pixels 2a to 2d. The input/output units 26 of the pixels 2a to 2d each transmit a pixel signal to the input/output units 41e and 41f, so that the photoelectric conversion apparatus 1 outputs a pixel signal based on photoelectric conversion. At this time, the vertical scan unit 3 and the horizontal scan unit 5 control selection of signal transmission to the pixels 2a to 2d. Thus, the vertical scan unit 3 and the horizontal scan unit 5 are commonly used to control both predetermined signal transmission and pixel signal transmission. With the above-described configurations, the photoelectric conversion apparatus 1 according to the present exemplary embodiment realizes both control of predetermined signal writing to and pixel signal reading from the pixels 2a to 2d and circuit area reduction. Furthermore, the photoelectric conversion apparatus 1 according to the present exemplary embodiment uses a common transmission line for setting signal transmission and pixel signal transmission so that the number of wiring lines is reduced and the area of the photoelectric conversion apparatus 1 is further reduced compared with the photoelectric conversion apparatus 1 according to the first exemplary embodiment.

In FIG. 5, the transmission lines PDAT1, PDAT2, and IDAT are illustrated as n bus wiring lines. This is based on a case where a pixel signal from the pixels 2a to 2d is n-bit data, and a predetermined setting signal output from the memory unit 6 does not necessarily have to be n-bit data. For example, a predetermined signal can be m-bit data, where m is less than n. In such a case, the memory unit 6 may transmit a predetermined signal to the pixels 2a to 2d via the transmission line IDAT and part of the transmission lines PDAT1 and PDAT2. Employing several-bit data as a predetermined signal improves the function of controlling each pixel. For example, an exposure time is controlled for each pixel.

Control of each pixel by the vertical scan unit 3 and the horizontal scan unit 5 is not essential. For example, in writing a predetermined signal, signal transmission to the input/output units 23 of the pixels 2a to 2d can be performed while the vertical scan unit 3 or the horizontal scan unit 5 is performing signal control. Even in such a case, since the common transmission line is used for predetermined signal transmission to the pixels 2a to 2d and signal transmission from the pixels 2a to 2d, the area of the photoelectric conversion apparatus 1 is still reduced.

The plurality of pixels 2a to 2d is arranged in a matrix form and the transmission lines PDAT1 and PDAT2 are arranged with respect to the respective columns in FIG. 5, but this is not restrictive. In another configuration according to the present exemplary embodiment, for example, a plurality of pixels is arranged in a row or column direction and a transmission line is connected to the plurality of pixels.

Figure 7:
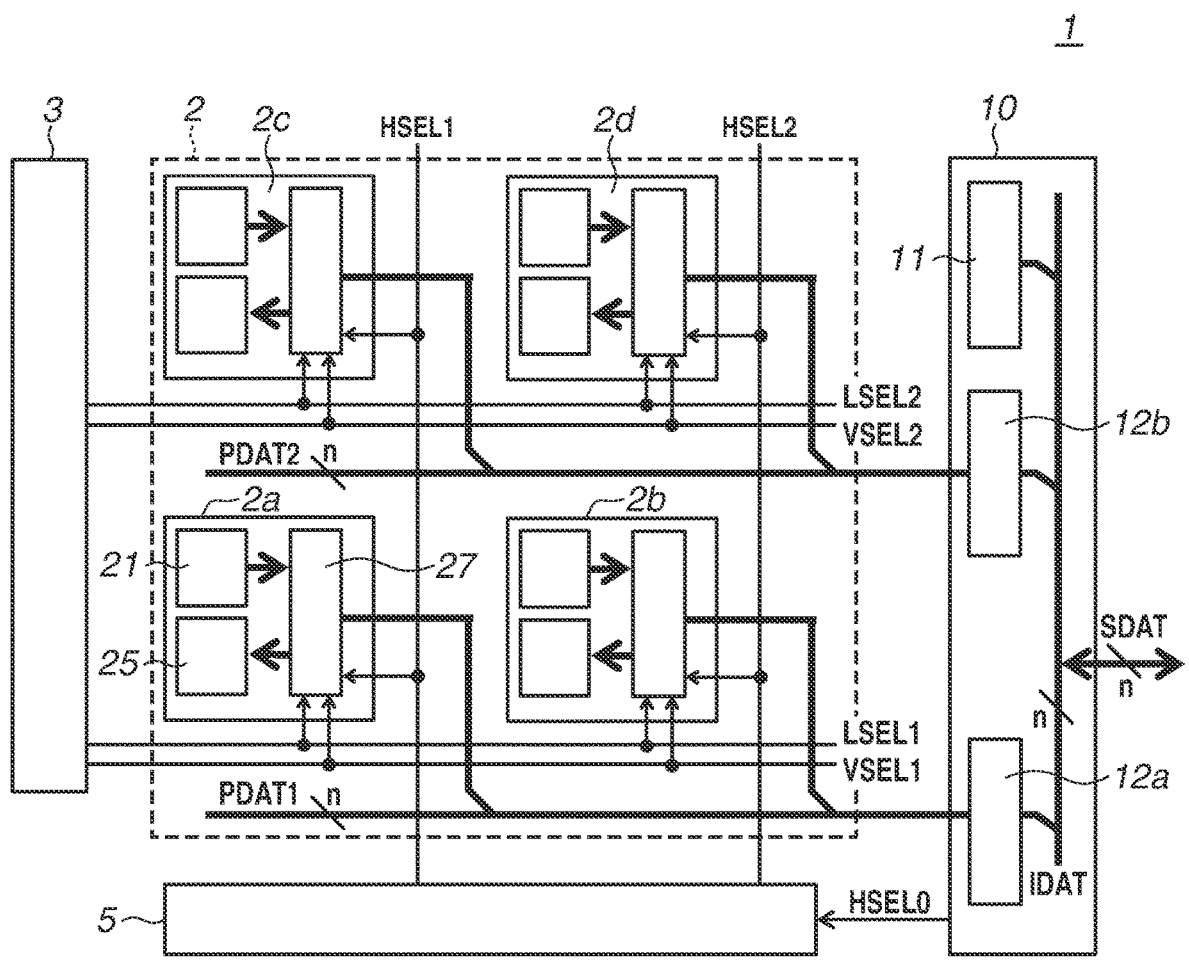
FIG. 7 is a schematic configuration diagram illustrating a photoelectric conversion apparatus according to a fourth exemplary embodiment.
Figure 8:
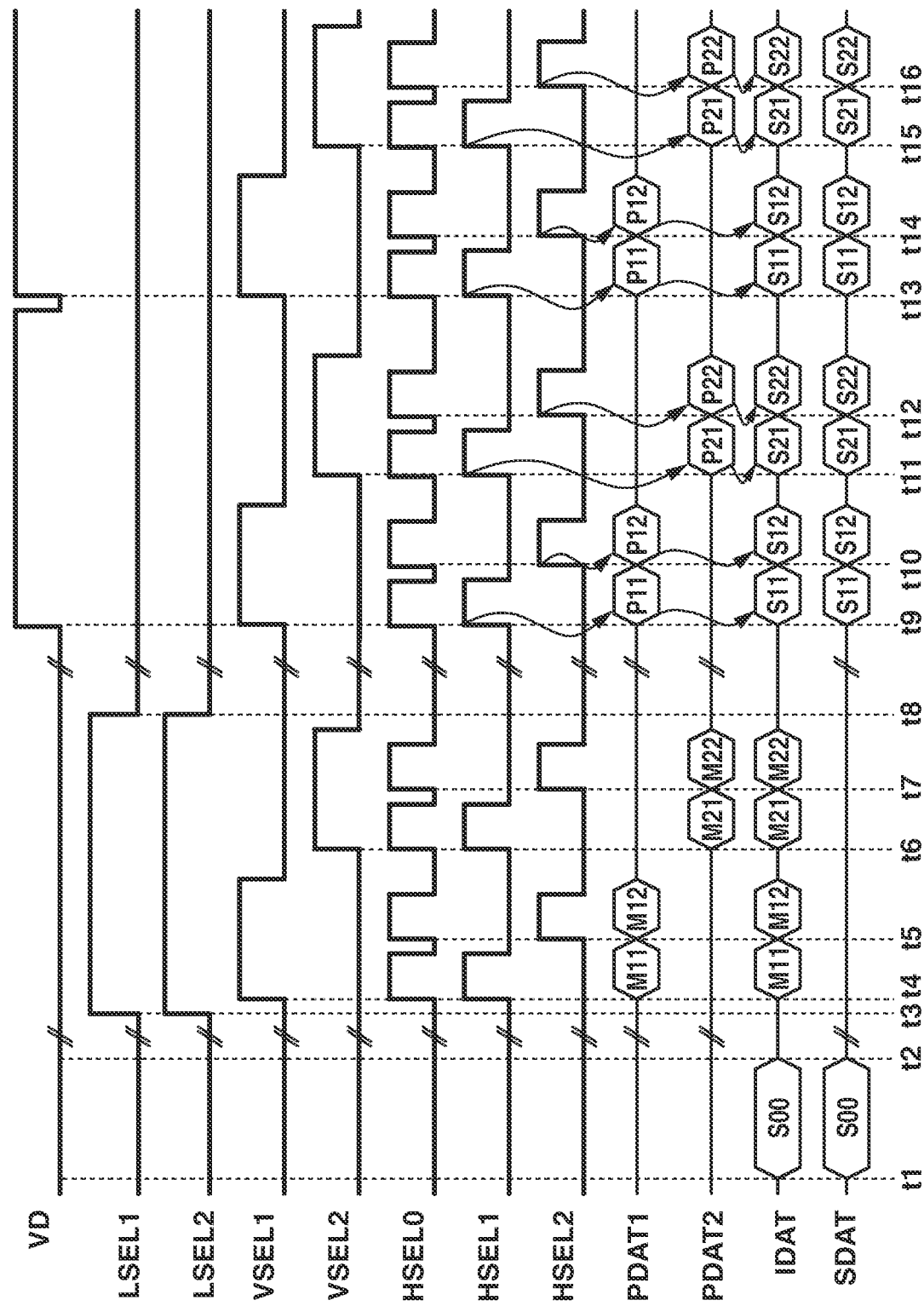
FIG. 8 is an operation timing chart illustrating the photoelectric conversion apparatus according to the fourth exemplary embodiment.

A fourth exemplary embodiment of the present disclosure will be described below. A photoelectric conversion apparatus according to the present exemplary embodiment will be described below with reference to FIGS. 7 and 8. FIG. 7 is a schematic configuration diagram illustrating the photoelectric conversion apparatus according to the present exemplary embodiment. FIG. 8 is a timing chart illustrating the driving of the photoelectric conversion apparatus according to the present exemplary embodiment.

The photoelectric conversion apparatus according to the present exemplary embodiment is different from the third exemplary embodiment in that, in the present exemplary embodiment, the transmission line PDAT1 is commonly connected to the plurality of pixels 2a and 2b of the same row and the transmission line PDAT2 is commonly connected to the plurality of pixels 2c and 2d of the same row. Another difference from the third exemplary embodiment is that a signal transmission/reception unit 10 includes input/output units 12a and 12b and outputs a signal in the present exemplary embodiment. Each component similar to that of the photoelectric conversion apparatus 1 according to the third exemplary embodiment is given the same reference numeral, and descriptions thereof are omitted or simplified.

As illustrated in FIG. 7, the photoelectric conversion apparatus 1 according to the present exemplary embodiment includes the pixel array unit 2, the vertical scan unit 3, the horizontal scan unit 5, and the signal transmission/reception unit 10. The pixel array unit 2 includes the plurality of pixels 2a to 2d.

The transmission line PDAT1 is commonly connected to the plurality of pixels 2a and 2b of the same row of the pixel array unit 2, and the transmission line PDAT2 is commonly connected to the plurality of pixels 2c and 2d of the same row of the pixel array unit 2. The transmission lines PDAT1 and PDAT2 are illustrated as n bus wiring lines in FIG. 7. The signal transmission/reception unit 10 includes the input/output units 12a and 12b. The input/output unit 12a is connected to the transmission line PDAT1. The input/output unit 12b is connected to the transmission line PDAT2. The signal transmission/reception unit 10 includes a memory unit 11. Furthermore, the memory unit 11 and the input/output units 12a and 12b are connected to the transmission line IDAT for input/output signal transmission from the transmission line SDAT. The transmission lines IDAT and SDAT are illustrated as n bus wiring lines in FIG. 7. The signal transmission/reception unit 10 stores a predetermined signal input via the transmission line SDAT in the memory unit 11 and sequentially transmits the predetermined signal to the input/output units 12a and 12b. Furthermore, the input/output units 12a and 12b of the signal transmission/reception unit 10 each receive a pixel signal from the pixels 2a to 2d, and the signal transmission/reception unit 10 sequentially outputs the pixel signal as the output signal SDAT of the photoelectric conversion apparatus 1.

The pixels 2a to 2d each include an input/output unit 27 and the pixel circuit units 21 and 25. The input/output units 27 of the pixels 2a and 2b are connected to the transmission line PDAT1. Similarly, the input/output units 27 of the pixels 2c and 2d are connected to the transmission line PDAT2. The column selection control line HSEL1 is connected to the horizontal scan unit 5 and the input/output units 27 of the pixels 2a and 2c. Similarly, the column selection control line HSEL2 is connected to the horizontal scan unit 5 and the input/output units 27 of the pixels 2b and 2d. The horizontal scan unit 5 feeds a control signal to the column selection control lines HSEL1 and HSEL2 to thereby enable predetermined signal transmission/reception and pixel signal transmission. The signal transmission/reception unit 10 synchronizes with the horizontal scan unit 5 using the control line HSEL0.

With the above-described configuration, the input/output units 12a and 12b sequentially receive a predetermined signal output from the memory unit 11 and transmit the predetermined signal to the pixels 2a to 2d. Furthermore, the input/output units 12a and 12b receive a pixel signal from each of the pixels 2a to 2d and sequentially output the pixel signal as the output signal SDAT of the photoelectric conversion apparatus 1 by an action of the signal transmission/reception unit 10.

Operations of the photoelectric conversion apparatus 1 in FIG. 7 will be described below with reference to a timing chart in FIG. 8.

FIG. 8 illustrates timings of signals fed to the control lines LSEL1, LSEL2, VSEL1, and VSEL2 by the vertical scan unit 3, a signal fed to the control line HSEL0 by the signal transmission/reception unit 10, and signals fed to the column selection control lines HSEL1 and HSEL2 by the horizontal scan unit 5. FIG. 8 further illustrates data about the transmission lines PDAT1, PDAT2, and IDAT, the input/output signal SDAT, and the vertical scan synchronization signal VD.

In FIG. 8, at time t1, data S00 is input to the photoelectric conversion apparatus 1. The data S00 is a data group (plurality of predetermined signals) corresponding to the predetermined signals for the pixels 2a to 2d and as described above, the data S00 is stored in the memory unit 11 via the transmission line IDAT.

At time t3, the control lines LSEL1 and LSEL2 are changed to the high-level, and then the photoelectric conversion apparatus 1 changes to an operation of outputting a predetermined signal to the pixels 2a to 2d.

At time t4, the data M11 is transmitted from the memory unit 11 to the transmission line IDAT, and is stored in the input/output unit 12a. As the control lines VSEL1 and HSEL0 are changed to the high-level, the column selection control line HSEL1 is changed to the high-level, and then the input/output unit 27 of the pixel 2a receives the data M11 via the transmission line PDAT1 and outputs the data M11 to the pixel circuit unit 25. At time t5, the data M12 is transmitted from the memory unit 11 to the transmission line IDAT, and is stored in the input/output unit 12a. As the control line HSEL0 is changed to the high-level, the column selection control line HSEL2 is changed to the high-level, and then the input/output unit 27 of the pixel 2b receives the data M12 via the transmission line PDAT1 and outputs the data M12 to the pixel circuit unit 25. Similarly, at time t6, the data M21 is transmitted from the memory unit 11 to the transmission line IDAT, and is stored in the input/output unit 12b. As the control lines VSEL2 and HSEL0 are changed to the high-level, the column selection control line HSEL1 is changed to the high-level, and then the input/output unit 27 of the pixel 2c receives the data M21 via the transmission line PDAT2 and outputs the data M21 to the pixel circuit unit 25. At time t7, the data M22 is transmitted from the memory unit 11 to the transmission line IDAT, and is stored in the input/output unit 12b. As the control line HSEL0 is changed to the high-level, the column selection control line HSEL2 is changed to the high-level, and then the input/output unit 27 of the pixel 2d receives the data M22 via the transmission line PDAT2 and outputs the data M22 to the pixel circuit unit 25.

At this time point, the pixels 2a, 2b, 2c and 2d have respectively received the data M11, M12, M21 and M22 as predetermined signals. Thus, the pixels 2a, 2b, 2c and 2d are each controlled based on the corresponding predetermined signal received by the pixel circuit units 25. At time t8, the control lines LSEL1 and LSEL2 is changed to the low-level, and at time t9, the vertical scan synchronization signal VD is changed to the high-level, and then the photoelectric conversion apparatus 1 changes to an operation of outputting a pixel signal based on photoelectric conversion.

At time t9, the control lines VSEL1 and HSEL0 are changed to the high-level and the column selection control line HSEL1 is changed to the high-level, and then the input/output unit 27 of the pixel 2a outputs the pixel signal P11 to the input/output unit 12a. At this time, a signal based on the pixel signal P11 from the pixel 2a is output as the output signal S11 of the photoelectric conversion apparatus 1 from the signal transmission/reception unit 10 via the transmission line IDAT. At time t10, the control line HSEL0 is changed to the high-level and the column selection control line HSEL2 is changed to the high-level, and then the input/output unit 27 of the pixel 2b outputs the pixel signal P12 to the input/output unit 12a. At this time, a signal based on the pixel signal P12 from the pixel 2b is output as the output signal S12 of the photoelectric conversion apparatus 1 from the signal transmission/reception unit 10 via the transmission line IDAT. Similarly, at time t11, the control lines VSEL2 and HSEL0 are changed to the high-level and the column selection control line HSEL1 is changed to the high-level, and then the input/output unit 27 of the pixel 2c outputs the pixel signal P21 to the input/output unit 12b. At this time, a signal based on the pixel signal P21 from the pixel 2c is output as the output signal S21 of the photoelectric conversion apparatus 1 from the signal transmission/reception unit 10 via the transmission line IDAT. At time t12, the control line HSEL0 is changed to the high-level and the column selection control line HSEL2 is changed to the high-level, and then the input/output unit 27 of the pixel 2d outputs the pixel signal P22 to the input/output unit 12b. At this time, a signal based on the pixel signal P22 from the pixel 2d is output as the output signal S22 of the photoelectric conversion apparatus 1 from the signal transmission/reception unit 10 via the transmission line IDAT. Thereafter, the vertical scan synchronization signal VD is changed to the low-level, and at time t13, the vertical scan synchronization signal VD is changed to the high-level again, and then the photoelectric conversion apparatus 1 repeats an operation of outputting a pixel signal based on photoelectric conversion.

As described above, the input/output units 12a and 12b each transmit a predetermined signal to the input/output units 27 of the pixels 2a to 2d in the photoelectric conversion apparatus 1 according to the present exemplary embodiment, so that predetermined signal writing to the pixels 2a to 2d and pixel signal reading from the pixels 2a to 2d are both controlled. At this time, the horizontal scan unit 5 and the vertical scan unit 3 control selection of signal transmission to the pixels 2a to 2d. The input/output units 27 of the pixels 2a to 2d transmit a pixel signal to the input/output units 12a and 12b, so that the photoelectric conversion apparatus 1 outputs a pixel signal based on photoelectric conversion. At this time, the vertical scan unit 3 and the horizontal scan unit 5 control selection of signal transmission to the pixels 2a to 2d. Thus, the vertical scan unit 3 and the horizontal scan unit 5 are commonly used to control both predetermined signal transmission and pixel signal transmission. With the above-described configuration, the photoelectric conversion apparatus 1 according to the present exemplary embodiment realizes both control of predetermined signal writing to and pixel signal reading from the pixels 2a to 2d and circuit area reduction. Furthermore, the transmission line PDAT1 is commonly connected to the plurality of pixels 2a and 2b of the same row of the pixel array unit 2, and the transmission line PDAT2 is commonly connected to the plurality of pixels 2c and 2d of the same row of the pixel array unit 2, and the signal transmission/reception unit 10 includes the input/output units 12a and 12b in the photoelectric conversion apparatus 1 according to the present exemplary embodiment. This realizes faster pixel signal reading than the photoelectric conversion apparatus 1 according to the third exemplary embodiment.

In the present exemplary embodiment, the transmission lines PDAT1, PDAT2, and IDAT are illustrated as n bus wiring lines. This is based on a case where a pixel signal from each of the pixels 2a to 2d is n-bit data, and a predetermined signal output from the memory unit 11 does not necessarily have to be n-bit data. For example, a predetermined signal can be m-bit data, where m is less than n. In such a case, a predetermined signal can be transmitted from the memory unit 11 to the pixels 2a to 2d via the transmission line IDAT and part of the transmission lines PDAT1 and PDAT2. Employing several-bit data as a predetermined signal improves the function of controlling each pixel in predetermined signal writing and pixel signal reading. For example, an exposure time is controlled for each pixel.

Figure 9:
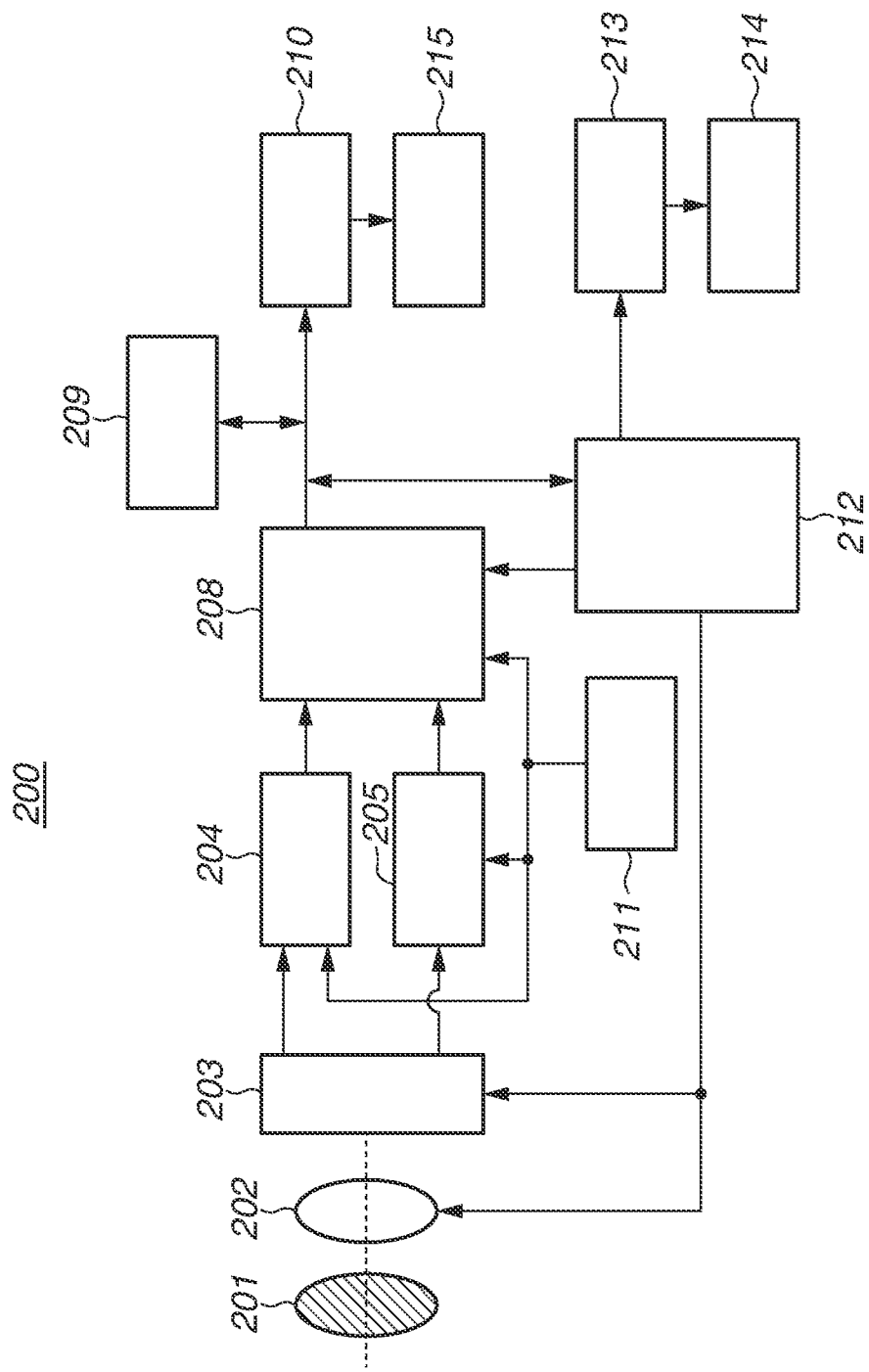
FIG. 9 is a configuration diagram illustrating an image capturing system according to a fifth exemplary embodiment.

A fifth exemplary embodiment of the present disclosure will be described below. An image capturing system according to the present exemplary embodiment will be described below with reference to FIG. 9. FIG. 9 is a block diagram illustrating an example of a configuration of the image capturing system according to the present exemplary embodiment.

As illustrated in FIG. 9, an image capturing system 200 according to the present exemplary embodiment includes a barrier 201, a lens 202, a diaphragm 203, a photoelectric conversion apparatus 204, and an autofocus (AF) sensor 205. The lens 202 is an optical system configured to form an optical subject image. The barrier 201 protects the lens 202. The diaphragm 203 adjusts the amount of light that passes through the lens 202. The photoelectric conversion apparatus 204 employs the photoelectric conversion apparatus 1 according to any of the first to fourth exemplary embodiments and acquires an optical subject image formed by the lens 202 as an image signal. The AF sensor 205 acquires a signal for focal point detection.

The image capturing system 200 further includes a signal processing unit 208. The signal processing unit 208 processes a signal output from the photoelectric conversion apparatus 204 or the AF sensor 205 and performs various types of correction on acquired image data or compresses data.

The image capturing system 200 further includes a memory unit 209, an external interface (external I/F) circuit 210, a timing generation unit 211, an overall control/calculation unit 212, and a recording medium control interface (recording medium control I/F) unit 213. The memory unit 209 temporarily stores image data. The external I/F circuit 210 communicates with an external device such as an external computer 215. The timing generation unit 211 outputs various timing signals to the signal processing unit 208. The overall control/calculation unit 212 controls various types of calculation and an entire camera. The recording medium control I/F unit 213 transmits and receives data to and from a removable recording medium 214 such as a semiconductor memory for recording acquired image data or reading image data.

When the barrier 201 is opened, an optical image from a subject enters the AF sensor 205 via the lens 202 and the diaphragm 203. The overall control/calculation unit 212 calculates a distance to the subject by a phase difference detection method based on the output signal from the AF sensor 205. Thereafter, the overall control/calculation unit 212 drives the lens 202 based on the calculation result and determines whether an image capturing surface is in focus again. In a case where the overall control/calculation unit 212 determines that the image capturing surface is not in focus, the overall control/calculation unit 212 performs AF control to drive the lens 202 again.

Next, after the overall control/calculation unit 212 determines that the image capturing surface is in focus, the photoelectric conversion apparatus 204 starts an electric charge accumulation operation. If the photoelectric conversion apparatus 204 finishes the electric charge accumulation operation, the overall control/calculation unit 212 writes an image signal output from the photoelectric conversion apparatus 204 to the memory unit 209 via the signal processing unit 208.

Thereafter, data accumulated in the memory unit 209 is recorded on the recording medium 214 via the recording medium control I/F unit 213 under control by the overall control/calculation unit 212. Alternatively, data accumulated in the memory unit 209 can be input directly to the external computer 215 via the external I/F circuit 210.

As described above in the first to fourth exemplary embodiments, use of the photoelectric conversion apparatus 1 according to any of the first to fourth exemplary embodiments realizes control of both digital signal writing to and digital signal reading from the pixels 2a to 2d. Thus, with the image capturing system 200 according to the present exemplary embodiment using the photoelectric conversion apparatus 204, an image with improved quality is acquired.

Figure 10A:
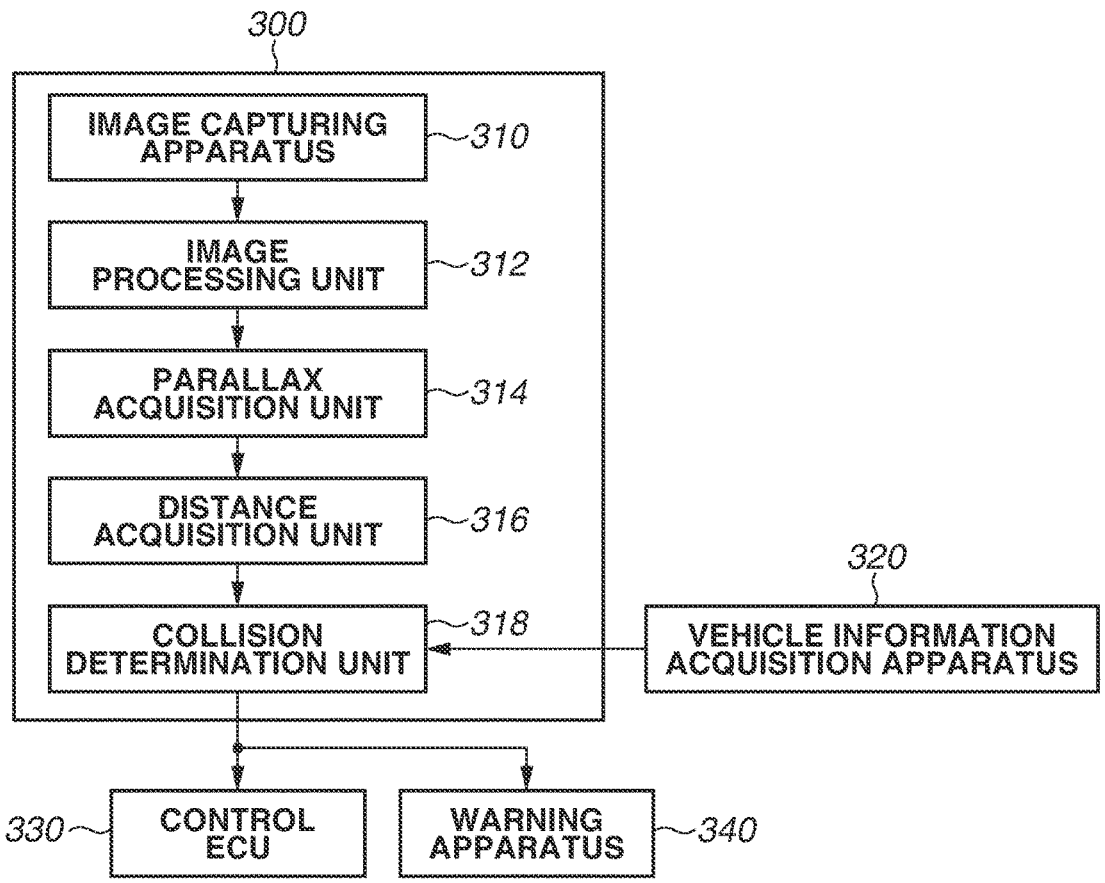
FIGS. 10A and 10B each are a configuration diagram illustrating a moving object according to a sixth exemplary embodiment.
Figure 10B:
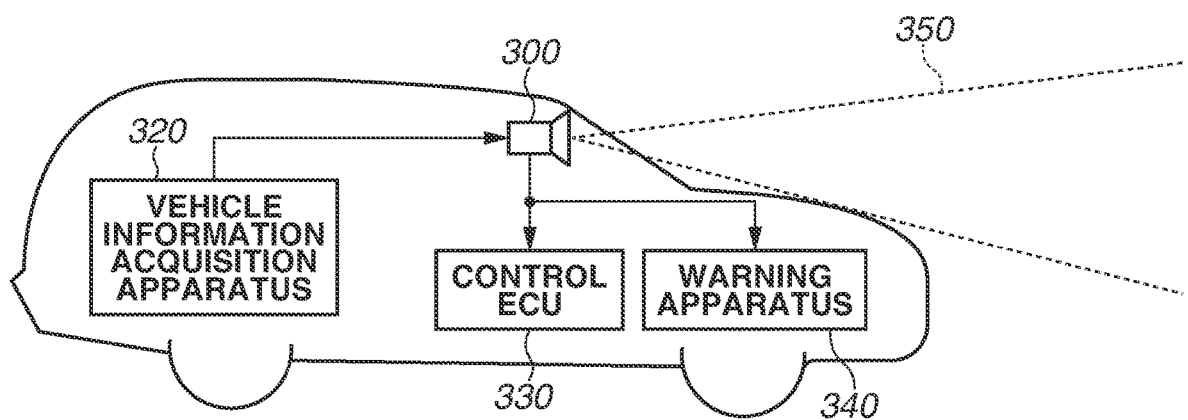

A sixth exemplary embodiment of the present disclosure will be described below. An image capturing system and a moving object according to the present exemplary embodiment will be described below with reference to FIGS. 10A and 10B. FIGS. 10A and 10B illustrate configurations of the image capturing system and the moving object according to the present exemplary embodiment.

FIG. 10A illustrates an example of an image capturing system that relates to an in-vehicle camera. An image capturing system 300 includes an image capturing apparatus 310. The image capturing apparatus 310 is a photoelectric conversion apparatus 1 according to any one of the first to fourth exemplary embodiments. The image capturing system 300 includes an image processing unit 312 and a parallax acquisition unit 314. The image processing unit 312 performs image processing on a plurality of pieces of image data acquired by the image capturing apparatus 310. The parallax acquisition unit 314 calculates a parallax (phase difference in parallax image) from the plurality of pieces of image data acquired by the image capturing system 300. The image capturing system 300 includes a distance acquisition unit 316 and a collision determination unit 318. The distance acquisition unit 316 calculates a distance to a target object based on the calculated parallax. The collision determination unit 318 determines a possibility of a collision based on the calculated distance. The parallax acquisition unit 314 and the distance acquisition unit 316 are an example of a distance information acquisition unit configured to acquire distance information about a distance to a target object. Specifically, the distance information is information about a parallax, defocus amount, and distance to a target object. The collision determination unit 318 may determine a possibility of a collision using any of the distance information. The distance information acquisition unit may be realized by dedicated hardware or software module. Alternatively, the distance information acquisition unit may be realized by a field programmable gate array (FPGA) or an application-specific integrated circuit (ASIC) or a combination thereof.

The image capturing system 300 is connected to a vehicle information acquisition apparatus 320 and acquires vehicle information, such as a vehicle speed, yaw rate, and rudder angle. The image capturing system 300 is connected to a control engine control unit (ECU) 330. The control ECU 330 is a control apparatus configured to output a control signal for generating braking force on a vehicle based on a determination result of the collision determination unit 318. The image capturing system 300 is also connected to a warning apparatus 340 configured to provide a warning to a driver based on the determination result of the collision determination unit 318. For example, in a case where the collision determination unit 318 determines that there is a high possibility of a collision, the control ECU 330 controls the vehicle to avoid a collision or reduce damage by applying a brake, releasing an accelerator, or reducing the engine output. The warning apparatus 340 warns a user by producing a warning sound, displaying warning information on a screen of a car navigation system, or vibrating a seatbelt or steering.

In the present exemplary embodiment, the image capturing system 300 captures an image of a region in the vicinity of the vehicle, e.g., the front or back of the vehicle. FIG. 10B illustrates the image capturing system 300 in a case where an image of the front (image capturing range 350) of the vehicle is captured. The vehicle information acquisition apparatus 320 transmits an instruction to the image capturing system 300 or the image capturing apparatus 310. This configuration further increases the accuracy of distance measurement.

While the example where control is performed to not collide with other vehicles is described above, the present exemplary embodiment is also applicable to the control of automatic driving to follow another vehicle or the control of automatic driving to stay within a traffic lane. Furthermore, the image capturing system 300 is applicable not only to vehicles such as private vehicles but also to moving objects (moving apparatuses), such as ships, aircraft, or industrial robots. The image capturing system 300 is also applicable not only to moving objects but also to devices that widely use object recognition, such as an intelligent transport system (ITS).

A seventh exemplary embodiment of the present disclosure will be described below. FIG. 11 illustrates a configuration example of a photoelectric conversion apparatus 101 according to the present exemplary embodiment. The photoelectric conversion apparatus 101 according to the present exemplary embodiment is a photon-counting photoelectric conversion apparatus. The photon counting photoelectric conversion apparatus employs an avalanche diode as a photoelectric conversion unit and counts the number of photons incident on the avalanche diode. A configuration outline of the photoelectric conversion apparatus 101 and the functions thereof will be described below.

The photoelectric conversion apparatus 101 according to the present exemplary embodiment includes pixels 102 to 105, a counter control circuit 106, and a count-upper-limit storage circuit 107 as illustrated in FIG. 11.

FIG. 11 illustrates a case where the pixels 102 to 105 arranged in two rows and two columns. The numbers of rows and columns of pixels are not limited thereto.

The configuration of the pixel 102 will be mainly described as a representative of the configurations of pixels 102 to 105. The pixel 102 includes a photoelectric conversion unit, a switch 108 (switches 109 to 111 for the pixels 103 to 105, respectively), a power supply unit, a ground, a resistor, and a counter circuit 112 (counter circuits 113 to 115 for the pixels 103 to 105, respectively). The photoelectric conversion unit includes an avalanche diode.

One node of the photoelectric conversion unit is connected to the ground, and a ground potential is applied to the node. The other node of the photoelectric conversion unit is connected to the power supply unit via the switch 108 and the resistor. The turning on and off of the switch 108 is controlled to control supply of a power source voltage to the other node of the photoelectric conversion unit. The resistor is connected to a position between the switch 108 and the power supply unit.

The counter circuit 112 is connected to a connection node between the switch 108 and the resistor. Signals from the photoelectric conversion unit are transmitted to the counter circuit 112 via the switch 108. While not illustrated, the counter circuit 112 may be connected to a connection node between the switch 108 and the resistor via an inverter circuit that configures a waveform shaping circuit. In such a case, electrical signals having been subjected to the photoelectric conversion are shaped into digital signals through the waveform shaping circuit, and the digital signals are transmitted to the counter circuit 112.

Horizontal control lines HL1 and HL2 are each connected to the counter control circuit 106. The horizontal control line HL1 is connected to the counter circuits 112 and 113 of the pixels 102 and 103, respectively, which are arranged in the horizontal direction. The horizontal control line HL2 is connected to the counter circuits 114 and 115 of the pixels 104 and 105, respectively, which are arranged in the horizontal direction. Vertical control lines VL1 and VL2 are each connected to the counter control circuit 106. The vertical control line VL1 is connected to the counter circuits 112 and 114 of the pixels 102 and 104, respectively, which are arranged in the vertical direction. The vertical control line VL2 is connected to the counter circuits 113 and 115 of the pixels 103 and 105, respectively, which are arranged in the vertical direction.

Output lines OL1 and OL2 are each connected to the counter control circuit 106. The output line OL1 is connected to the counter circuits 112 and 114, and is used for transmitting a pixel signal output from each of the counter circuits 112 and 114. The output line OL2 is connected to the counter circuits 113 and 115, and is used for transmitting a pixel signal output from each of the counter circuits 113 and 115. The number of bits of each of the signals is not limited.

A count-upper-limit request signal line and a count-upper-limit output signal line are connected to the count-upper-limit storage circuit 107 and the counter control circuit 106. The counter control circuit 106 transmits a signal for requesting a count-upper limit to the count-upper-limit storage circuit 107 by the count-upper-limit request signal line. The count-upper-limit storage circuit 107 outputs a count-upper limit (count-upper-limit output signal) to the counter control circuit 106 by the count-upper-limit output signal line. The number of bits of each of the count-upper-limit request signal and the count-upper-limit output signal is not limited.

FIG. 11 illustrates the counter control circuit 106 only in the horizontal direction, and the horizontal control lines HL1 and HL2 are detoured. Alternatively, the counter control circuit 106 may be arrange in both the horizontal and vertical directions, and the horizontal control lines HL1 and HL2 may be connected to the counter control circuit 106 in the vertical direction. Such an arrangement reduces a density of signal lines near the counter control circuit 106.

The counter control circuit 106 transmits, by the horizontal control line HL1, a counter selection signal, a count value request signal, a counter-stop-command signal, and a counter-reset-command signal to the counter circuits 112 and 113 of the pixels 102 and 103, respectively, arranged in the horizontal direction. The counter control circuit 106 transmits, by the horizontal control line HL2, the counter selection signal, the count value request signal, the counter-stop-command signal, and the counter-reset-command signal to the counter circuits 114 and 115 of the pixels 104 and 105, respectively, arranged in the horizontal direction. The counter control circuit 106 transmits, by the vertical control line VL1, the counter selection signal, the count value request signal, the counter-stop-command signal, the counter-reset-command signal to the counter circuits 112 and 114 of the pixels 102 and 104, respectively, arranged in the vertical direction. The counter control circuit 106 transmits, by the vertical control line VL2, the counter selection signal, the count value request signal, the counter-stop-command signal, the counter-reset-command signal to the counter circuits 113 and 115 of the pixels 103 and 105, respectively, arranged in the vertical direction.

Figure 12:
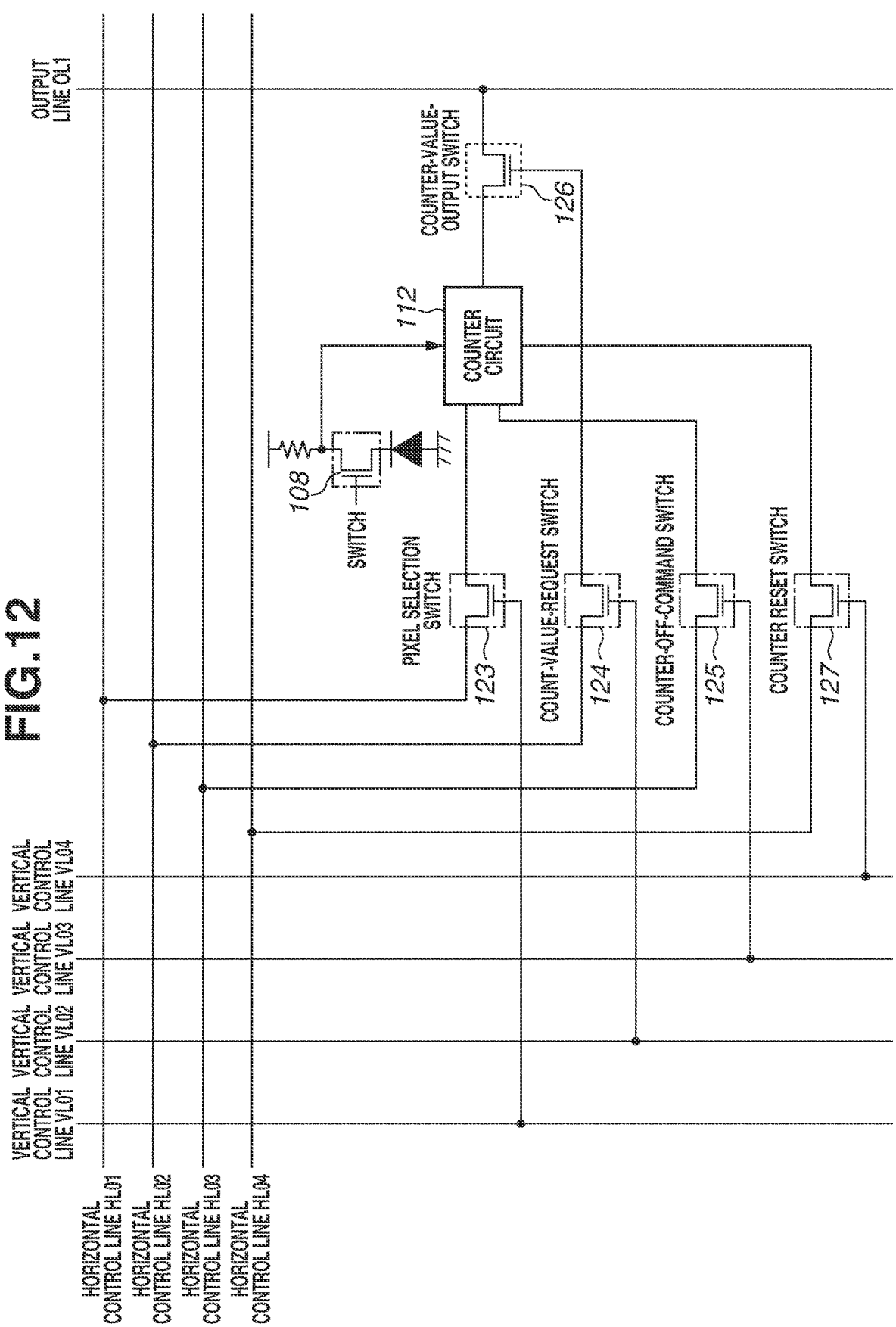
FIG. 12 illustrates a schematic configuration of a pixel according to the seventh exemplary embodiment.

FIG. 12 illustrates a configuration example of a pixel. In FIG. 12, the configuration of the pixel 102 is illustrated as a representative description of the pixels 102 to 105. The configuration of the other pixels, the pixels 103 to 105, is similar to that of the pixel 102, and thus, descriptions thereof are omitted.

The horizontal control lines HL01 to HL04 illustrated in FIG. 12 correspond to the horizontal control line HL1 illustrated in FIG. 11. The vertical control lines VL01 to VL04 illustrated in FIG. 12 correspond to the vertical control line VL1 illustrated in FIG. 11. Thus, the horizontal control lines HL01 to HL04 and the vertical control lines VL01 to VL04 are connected to the counter control circuit 106.

The counter circuit 112 is controlled by control of the potential to be applied to the horizontal control lines HL01 to HL04 constituting the horizontal control line HL1 and to the vertical control lines VL01 to VL04 constituting the vertical control line V11

The pixel 102 further includes a pixel selection switch 123, a count-value-request switch 124, a counter-off-command switch 125, a counter-value-output switch 126, and a counter reset switch 127 which are connected to the counter circuit 112, as illustrated in FIG. 12. FIG. 12 illustrates an example in which each switch is configured with a transistor, but the configuration of each switch is not limited thereto. A transfer gate may be used as each switch.

The pixel selection switch 123 is connected to the horizontal control line HL01 and the vertical control line VL01. The counter circuit 112 is selected as a control target in a case where both the horizontal control line HL01 and the vertical control line VL01 become a high-level.

The count-value-request switch 124 is connected to the counter-value-output switch 126. Such a structure realizes the configuration in which the counter-value-output switch 126 is turned ON in a case where the count-value-request switch 124 is turned ON, which will be described in detail below.

The count-value-request switch 124 is connected to the horizontal control line HL02 and the vertical control line VL02. In a case where both the horizontal control line HL02 and the vertical control line VL02 become a high level, a count value of the counter circuit 112 is requested, and the count-value-request switch 124 is turned ON.

The counter-off-command switch 125 is connected to the counter circuit 112. The counter-off-command switch 125 is also connected to the horizontal control line HL03 and the vertical control line VL03. The counter-off-command switch 125 is turned on in a case where both the horizontal control line HL03 and the vertical control line VL03 become a high level, and an OFF-signal for stopping a counting operation is transmitted to the counter circuit 112. This stops the counting operation of the counter circuit.

The counter reset switch 127 is connected to the counter circuit 112. The counter reset switch 127 is also connected to the horizontal control line HL04 and the vertical control line VL04. The counter reset switch 127 is turned ON in a case where both the horizontal control line HL04 and the vertical control line VL04 become a high level, and a counter-reset signal is transmitted to the counter circuit 112. This resets the count value of the counter circuit.

The counter-value-output switch 126 is connected to the counter circuit 112, the count-value-request switch 124, and the output line OL1. While FIG. 12 illustrates one bit of data is output, a plurality of bits of data may be output. In such a case, as many signal lines as the number of bits of data to be output from the counter-value-output switch 126 are required.

In a case where the count-value-request switch 124 is turned on and the count value is output from the counter circuit 112, the count value is output via the counter-value-output switch 126 to the output line OL1.

In this circuit configuration, the number of switches necessary for the counter control for each pixel is five when information for the count value is one bit. Thus, the circuit scale necessary for the counter control is kept at minimum.

While the pixel selection switch 123 is connected to the counter circuit 112 in FIG. 12, the pixel selection switch 123 may be connected to a pixel element other than the counter circuit 112.

Figure 13:
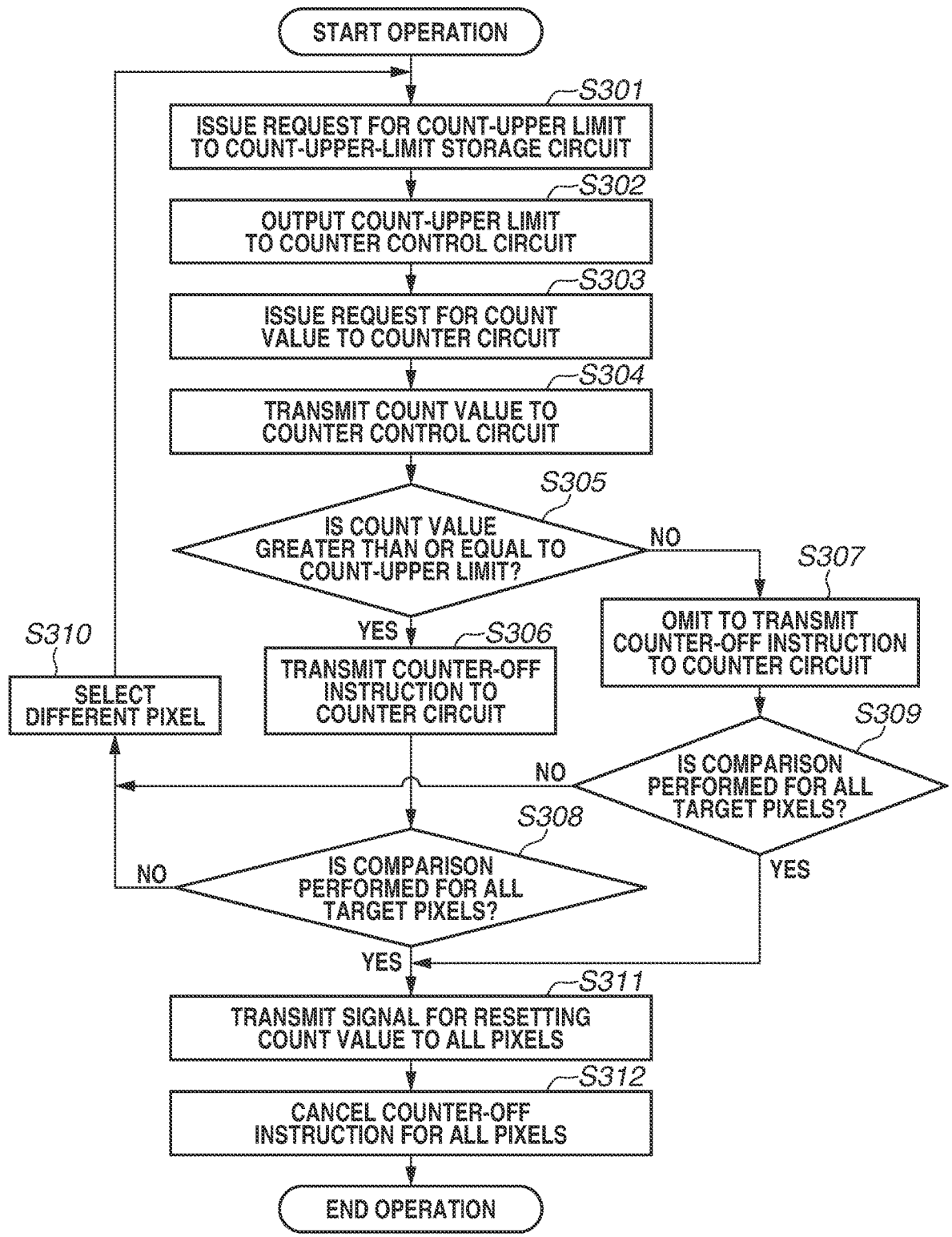
FIG. 13 is a flowchart illustrating counter control of the photoelectric conversion apparatus according to the seventh exemplary embodiment.

FIG. 13 illustrates a flowchart of the counter circuit control of the photoelectric conversion apparatus 101 according to the seventh exemplary embodiment.

Initially in step S301, the counter control circuit 106 issues a request for a count-upper limit to the count-upper-limit storage circuit 107. In step 302, the count-upper-limit storage circuit 107 then outputs the count-upper limit to the counter control circuit 106.

In step S303, the counter control circuit 106 issues a request for the count value to the counter circuit 112. In step S304, the counter circuit 112 transmits the count value to the counter control circuit 106.

Next in step S305, the counter control circuit 106 compares the count value and the count-upper limit.

The flowchart in FIG. 13 illustrates merely an example, and the operations in step S301, S302, S303, and S304 may be simultaneously performed if the operations in step S301 to S304 are completed before the execution of the operation in step S305.

If the count value is greater than or equal to the count-upper limit (YES, in step S305), the processing proceeds to step S306. In step S306, the counter control circuit 106 transmits a counter-off instruction to the counter circuit 112.

If the count value is less than the count-upper limit (NO, in step S305), the processing proceeds to step S307. In step S307, the counter control circuit 106 does not transmit the counter-OFF instruction to stop the counting operation to the counter circuit 112.

In steps S308 and S309, it is determined whether the comparison is performed for all target pixels in order to move the control target to a different pixel.

If it is determined that not all the target pixels have been subjected to the comparison, the processing proceeds to step S310. In step S310, a different pixel is selected. The processing then returns to step S301.

The foregoing processing is merely an example, and, in a case where the count-upper limit is not changed, the processing may return, not to step S301, but to step S303. Then, the operation of the processing may be performed. In such a case, it can be expected that processing speed will be improved.

A method for selecting a different pixel is not limited. For example, the different pixel may be selected one by one in a row direction or a column direction. The providing of the method for selecting the different pixel to the counter control circuit 106 enables the counter control circuit 106 to determine whether the comparison is performed for all the target pixels.

If it is determined that the comparison is performed for all the target pixels (YES, in step S308 or in step S309), the processing proceeds to step S311. In step S311, a signal for resetting the count value is transmitted to all pixels. In step S312, the counter-off instruction is cancelled for all the pixels. The operation in step S312 enables a restart of the counting.

Figure 14:
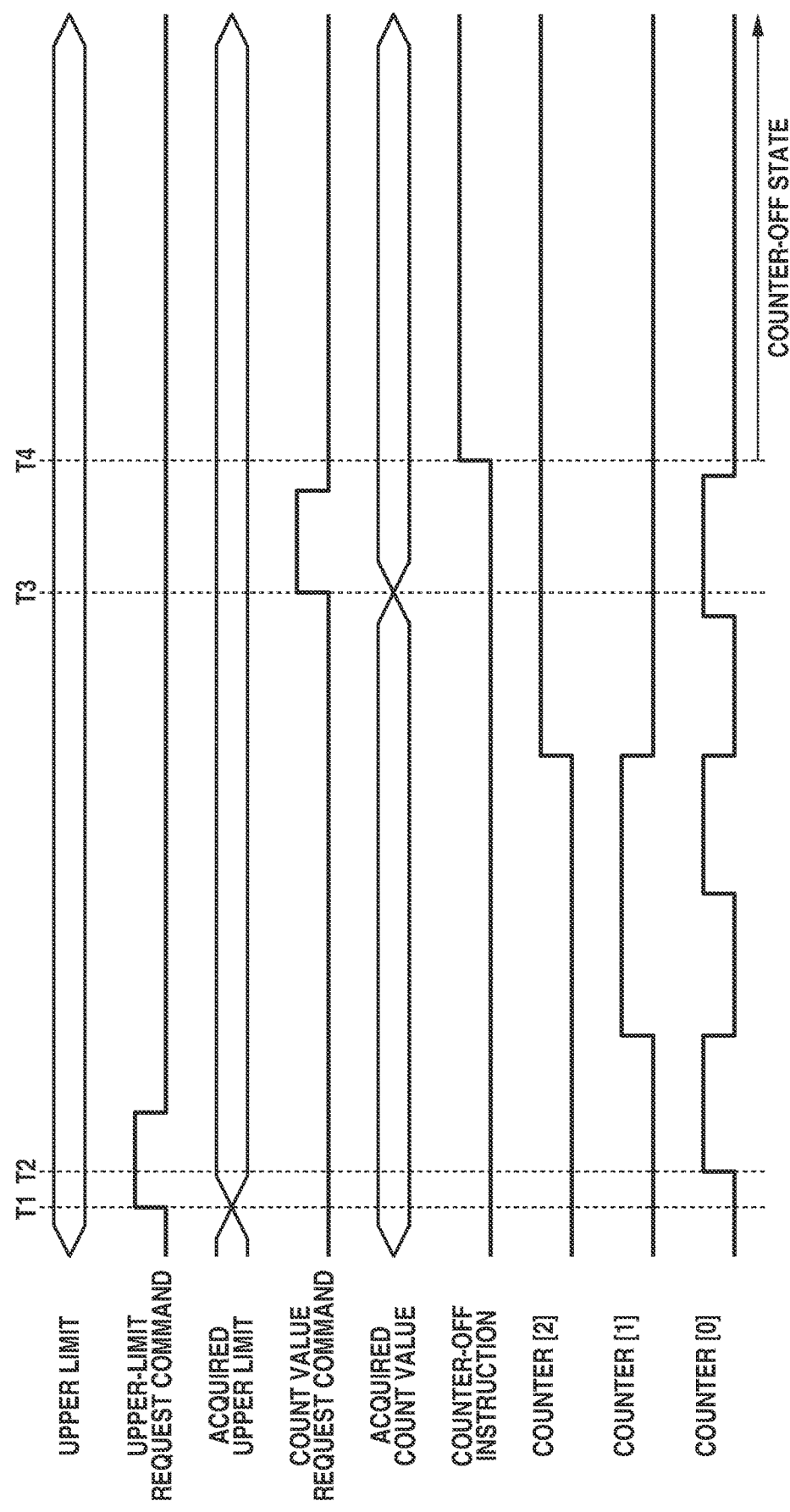
FIG. 14 is a timing chart illustrating an example of the counter control of the photoelectric conversion apparatus according to the seventh exemplary embodiment.

FIG. 14 illustrates a timing chart of the counter control of the photoelectric conversion apparatus 101 according to the present exemplary embodiment in a case where the counter is turned off. The operation of the photoelectric conversion apparatus 101 illustrated in FIG. 11 will be described below with reference to FIG. 14.

FIG. 14 illustrates an upper limit to be stored in the count-upper-limit storage circuit 107. FIG. 14 further illustrates an upper-limit request command (count-upper-limit request signal) which the counter control circuit 106 transmits, an acquired upper limit which is received by the counter control circuit 106, a count value request command which the counter control circuit 106 transmits, an acquired count value which the counter control circuit 106 receives, and a counter-OFF instruction which the counter control circuit 106 transmits. A counter signal in a certain pixel is illustrated with three bits. Here, the counter signal may be greater or less than, or equal to three bits.

In FIG. 14, at time T1, a signal for the upper-limit request command is changed to a high level. As a result, the acquired upper limit is updated. At time T2, a counter circuit in a certain pixel starts an operation.

At time T3, a signal for the count value request command is changed to a high level. As a result, the count value is transmitted to the counter control circuit 106 from the certain pixel, and the acquired count value is updated.

The acquired upper limit and the acquired count value are then compared, and, in a case where the acquired count value is greater than or equal to the acquired upper limit, the counter-OFF instruction of the counter control circuit 106 is changed to the high level at time T4.

In response to the certain pixel having received the counter-OFF instruction signal at the high level, the counter circuit of the certain pixel is stopped and the counter operation becomes an off state. In such a case, the respective bits of the signals in the counter circuit retain the values thereof before the stop.

While the operation at time T2 is performed after the operation at time T1 in FIG. 14, the order of the operations is not limited thereto. For example, the operation at time T2 may be performed before the operation at time T1, or the operation at time T1 and the operation at time T2 may be simultaneously performed.

Figure 15:
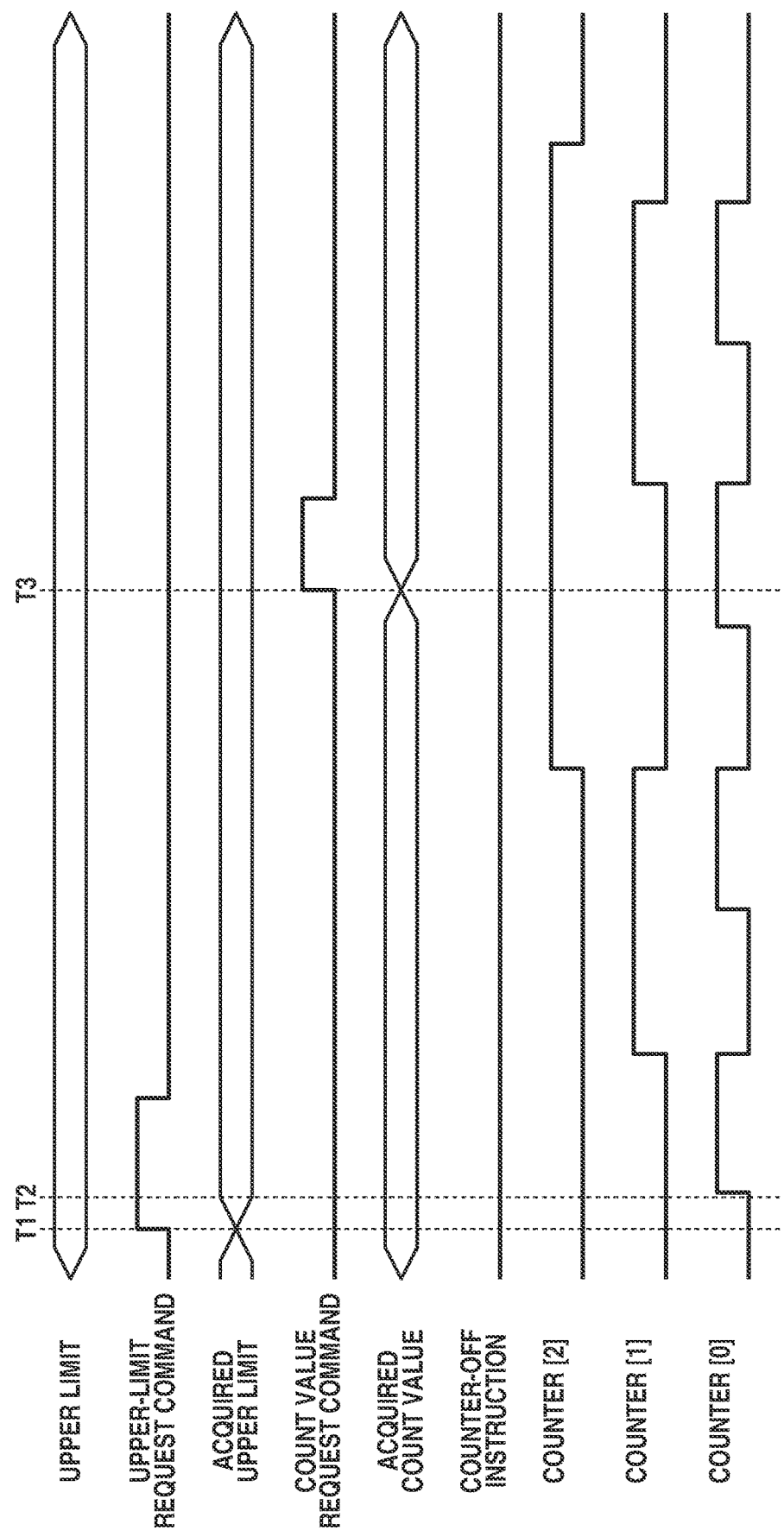
FIG. 15 is a timing chart illustrating an example of the counter control of the photoelectric conversion apparatus according to the seventh exemplary embodiment.

FIG. 15 illustrates a timing chart of the counter control of the photoelectric conversion apparatus 101 according to the present exemplary embodiment in a case where the counter circuit is not turned off. The operation of the photoelectric conversion apparatus 101 illustrated in FIG. 11 will be described below with reference to FIG. 15.

The names of the signals illustrated in FIG. 15 are the same as those in FIG. 14, and thus, descriptions thereof are omitted. The operations at times T1 and T2 are similar to those in FIG. 14, and thus, descriptions thereof are omitted.

After the acquired count value is updated, the acquired upper limit and the acquired count value are compared at time T3, and, in a case where the acquired count value is less than the acquired upper limit, the signal for the counter-OFF instruction of the counter control circuit 106 is kept at a low level. Accordingly, the counter circuit of a certain pixel is continued to operate.

Figure 16:
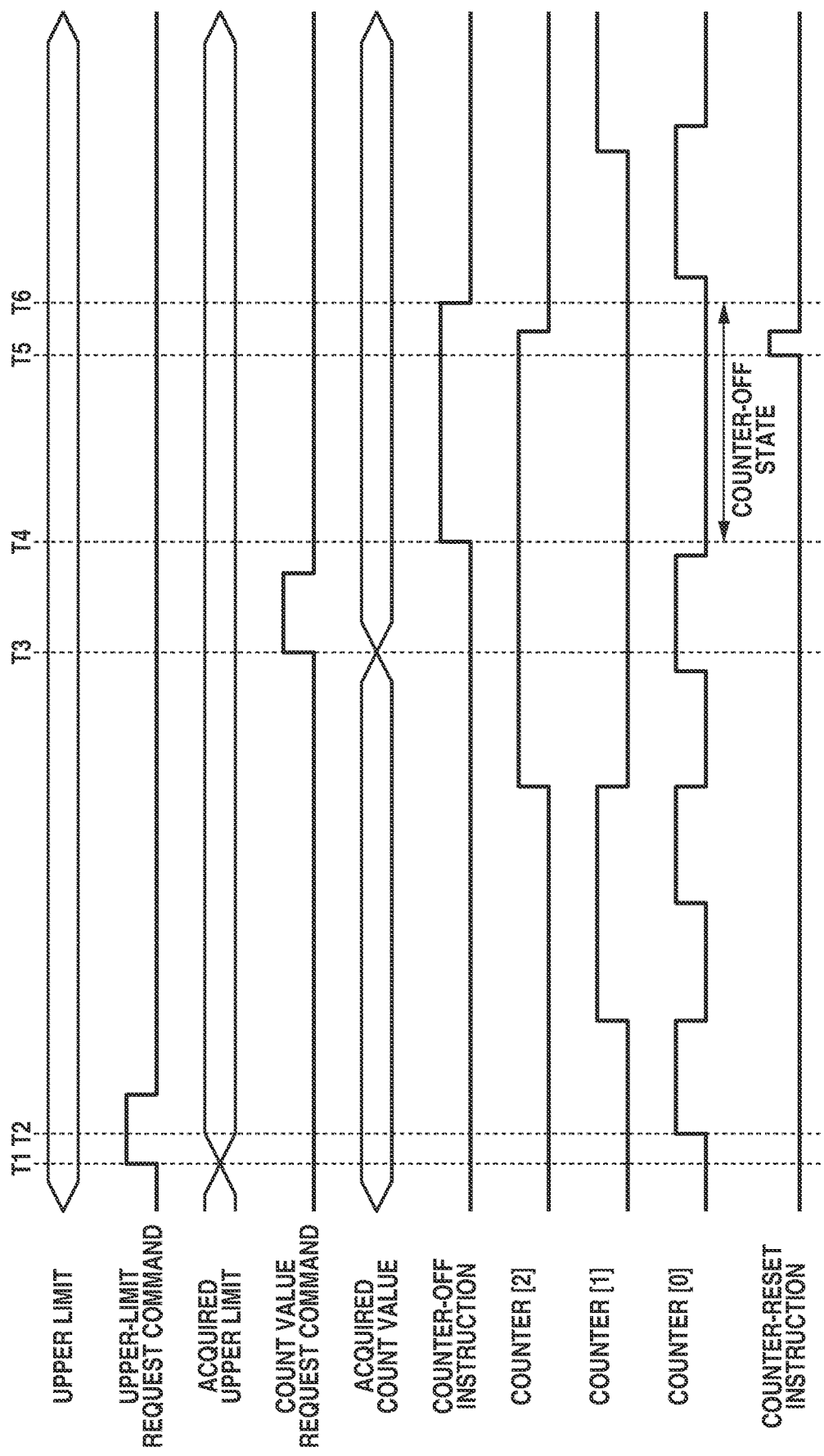
FIG. 16 is a timing chart illustrating an example of the counter control of the photoelectric conversion apparatus according to the seventh exemplary embodiment.

FIG. 16 illustrates a timing chart of the counter control of the photoelectric conversion apparatus 101 according to the present exemplary embodiment in a case where the counter circuit is restarted. The operation of the photoelectric conversion apparatus 101 illustrated in FIG. 11 will be described below with reference to FIG. 16.

The names of the signals illustrated in FIG. 16 are the same as those of FIG. 14 except for a counter-reset instruction, and thus, descriptions of those with the same names are omitted.

FIG. 16 illustrates a counter-reset instruction which is transmitted from the counter control circuit 106 to a pixel circuit. The operations at times T1, T2, and T3 are similar to those in FIG. 14, and thus, descriptions thereof are omitted.

A signal for the counter-reset instruction of the counter control circuit 106 to reset the counter circuit is changed to a high level at time T5. In response to the pixel circuit having received the high signal for the counter-reset instruction, all bits of the counter circuit of the pixel circuit are changed to a low level. In other words, the counter circuit is reset.

At time T6, the signal for the counter-off instruction of the counter control circuit 106 is changed to the low level. In response to a certain pixel circuit having received the low signal for the counter-off instruction, the counter of the certain pixel circuit starts operation. In other words, the counter circuit is restarted.

According to the present exemplary embodiment, a signal based on a signal output from a pixel is input to the pixel as described above. More specifically, a signal for controlling a counter circuit is input to the counter circuit of a pixel on the basis of a signal output from the counter circuit.

According to the present exemplary embodiment, the counter control circuit 106 individually controls each of a plurality of pixels. Thus, the circuit scale can be reduced compared with a configuration in which the counter control circuit 106 is provided for each pixel. Additionally, power consumption can be reduced by the counter circuit being turned off in a case where the count value is greater than or equal to the count-upper limit.

Figure 17:
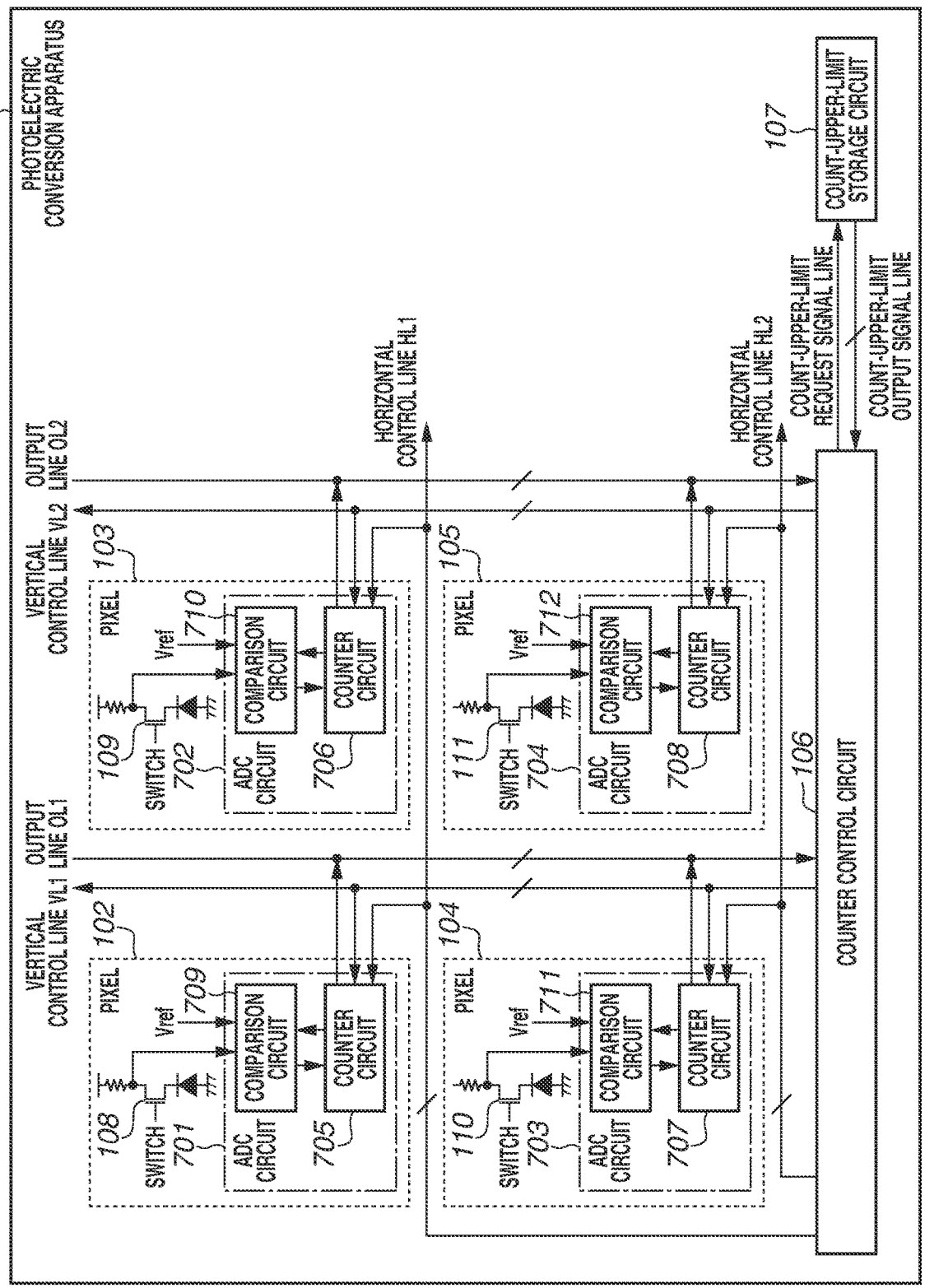
FIG. 17 illustrates a schematic configuration of a photoelectric conversion apparatus according to an eighth exemplary embodiment.

An eighth exemplary embodiment of the present disclosure will be described below. FIG. 17 illustrates a schematic configuration example of a photoelectric conversion apparatus 101 according to the present exemplary embodiment. The photoelectric conversion apparatus 101 according to the present exemplary embodiment is different from the seventh exemplary embodiment in that a photoelectric conversion unit includes a photodiode and each pixel includes an analog to digital converter (ADC) circuit in the present exemplary embodiment. The eighth exemplary embodiment will be described, assigning the same reference numerals or signs to portions similar to the seventh exemplary embodiment and omitting descriptions thereof.

FIG. 17 illustrate a configuration example of the photoelectric conversion apparatus 101 according to the eighth exemplary embodiment. The photoelectric conversion apparatus 101 according to the present exemplary embodiment includes pixels 102 to 105, a counter control circuit 106, and a count-upper-limit storage circuit 107 as illustrated in FIG. 17.

The pixels 102 to 105 each include the ADC circuit as described above. While FIG. 17 illustrates a case where the pixels 102 to 105 are arranged in two rows and two columns, the numbers of the rows and the columns are not limited thereto.

The configuration of pixel 102 will be mainly described as a representative of the configurations of pixels 102 to 105. The pixel 102 includes a photoelectric conversion unit, a switch 108 (switches 109 to 111 for the pixels 103 to 105, respectively), a power supply unit, a ground, a resistor, and the ADC circuit 701 (ADC circuits 702 to 704 for the pixels 103 to 105, respectively). The ADC circuit 701 includes a counter circuit 705 and a comparison circuit 709 (ADC circuits 702 to 704 each include counter circuits 706 to 708, respectively).

One node of the photoelectric conversion unit is connected to the ground, and the ground potential is applied to the node. The other node of the photoelectric conversion unit is connected to the power supply unit via the switch 108 and the resistor. The turning on and off of the switch 108 is controlled to control supply of power source voltage to the other node of the photoelectric conversion unit. The resistor is connected to a position between the switch 108 and the power supply unit.

The other node of the photoelectric conversion unit is connected to the power supply unit via the switch 108.

The configuration of the ADC circuit 701 will be described below as a representative of the configuration of each of the ADC circuits 701 to 704. The ADC circuit 701 includes a counter circuit 705 and a comparison circuit 709.

A signal from the photoelectric conversion unit is transmitted to the comparison circuit 709 via the switch 108. The comparison circuit 709 is connected to a Vref signal line for a Vref signal used for a reference voltage. The Vref signal may be included in each pixel or set from a circuit outside of the pixels 102 to 105.

The counter circuit 705 and the comparison circuit 709 are connected, and configured to output signals to each other. For example, the comparison circuit 709 is capable of outputting to the counter circuit 705 a signal for requesting a count value. The counter circuit 705 is capable of outputting the count value to the comparison circuit 709.

The counter circuit 705 has the function of measuring a time for an output voltage from the photoelectric conversion unit to reach a reference voltage.

The comparison circuit 709 has, for example, the function of comparing the reference voltage and the output voltage from the photoelectric conversion unit.

Here, the circuit configuration in FIG. 17 is based on the assumption that analog to digital (AD) conversion is performed based on the comparison of the reference voltage and the output voltage. However, if a configuration including a counter circuit is employed, the method used for the ADC circuit is not limited thereto.

A horizontal control line HL1 is connected to the counter control circuit 106 and the counter circuits 705 and 706 of the pixels 102 and 103, respectively, which are arranged in the horizontal direction. A horizontal control line HL2 is connected to the counter control circuit 106 and the counter circuits 707 and 708 of the pixels 104 and 105, respectively, which are arranged in the horizontal direction. A vertical control line VL1 is connected to the counter control circuit 106 and the counter circuits 705 and 707 of the pixels 102 and 104, respectively, which are arranged in the vertical direction. A vertical control line VL2 is connected to the counter circuits 706 and 708 of the pixels 103 and 105, respectively, which are arranged in the vertical direction.

An output line OL1 is connected to the counter control circuit 106 and the counter circuits 705 and 707 of the pixels 102 and 104, respectively, which are arranged in the vertical direction. An output line OL2 is connected to the counter control circuit 106 and the counter circuits 706 and 708 of the pixels 103 and 105, respectively, which are arranged in the vertical direction. The number of bits of the signals are not limited.

While the counter control circuit 106 is arranged only in the horizontal direction also in FIG. 17, the counter control circuit 106 may be arranged in both the horizontal and vertical directions as in the seventh exemplary embodiment.

The counter control circuit 106 transmits, by the horizontal control line HL1, a counter selection signal, a count value request signal, a counter-stop-command signal, a counter-reset-command signal to the counter circuits 705 and 706 of the pixels 102 and 103, respectively, which are arranged in the horizontal direction. The counter control circuit 106 transmits, by the horizontal control line HL2, the counter selection signal, the count value request signal, the counter-stop-command signal, and the counter-reset-command signal to the counter circuits 707 and 708 of the pixels 104 and 105, respectively, which are arranged in the horizontal direction.

The counter control circuit 106 transmits, by the vertical control line VL1, the counter selection signal, the count value request signal, the counter-stop-command signal, and the counter-reset-command signal to the counter circuits 705 and 707 of the ADC circuits 701 and 703 in the pixels 102 and 104, respectively, which are arranged in the vertical direction. The counter control circuit 106 transmits, by the vertical control line VL2, the counter selection signal, the count value request signal, the counter-stop-command signal, and the counter-reset-command signal to the counter circuits 706 and 708 of the ADC circuits 702 and 704 in the pixels 103 and 105, respectively, which are arranged in the vertical direction.

The output line OL1 is used for transmitting the count value to the counter control circuit 106 from each of the counter circuits 705 and 707 of the ADC circuits 701 and 703 in the pixels 102 and 104 arranged in the vertical direction. The output line OL2 is used for transmitting the count value to the counter control circuit 106 from each of the counter circuits 706 and 708 of the ADC circuits 702 and 704 in the pixels 103 and 105 arranged in the vertical direction.

A count-upper-limit request signal line and a count-upper-limit output signal line are connected to the count-upper-limit storage circuit 107 and the counter control circuit 106. The range of bits for the count-upper-limit request signal line and the count-upper-limit output signal line are not limited.

The count-upper-limit request signal line is used for transmitting a signal for requesting the count-upper limit from the counter control circuit 106 to the count-upper-limit storage circuit 107. The count-upper-limit output signal line is used for transmitting the count-upper limit from the count-upper-limit storage circuit 107 to the counter control circuit 106.

The above-described configuration enables the counter control circuit 106 to control each of the plurality of pixel circuits. Thus, the circuit scale is reduced compared with a configuration in which the counter control circuit 106 is provided for each of the plurality of pixels.

Figure 18:
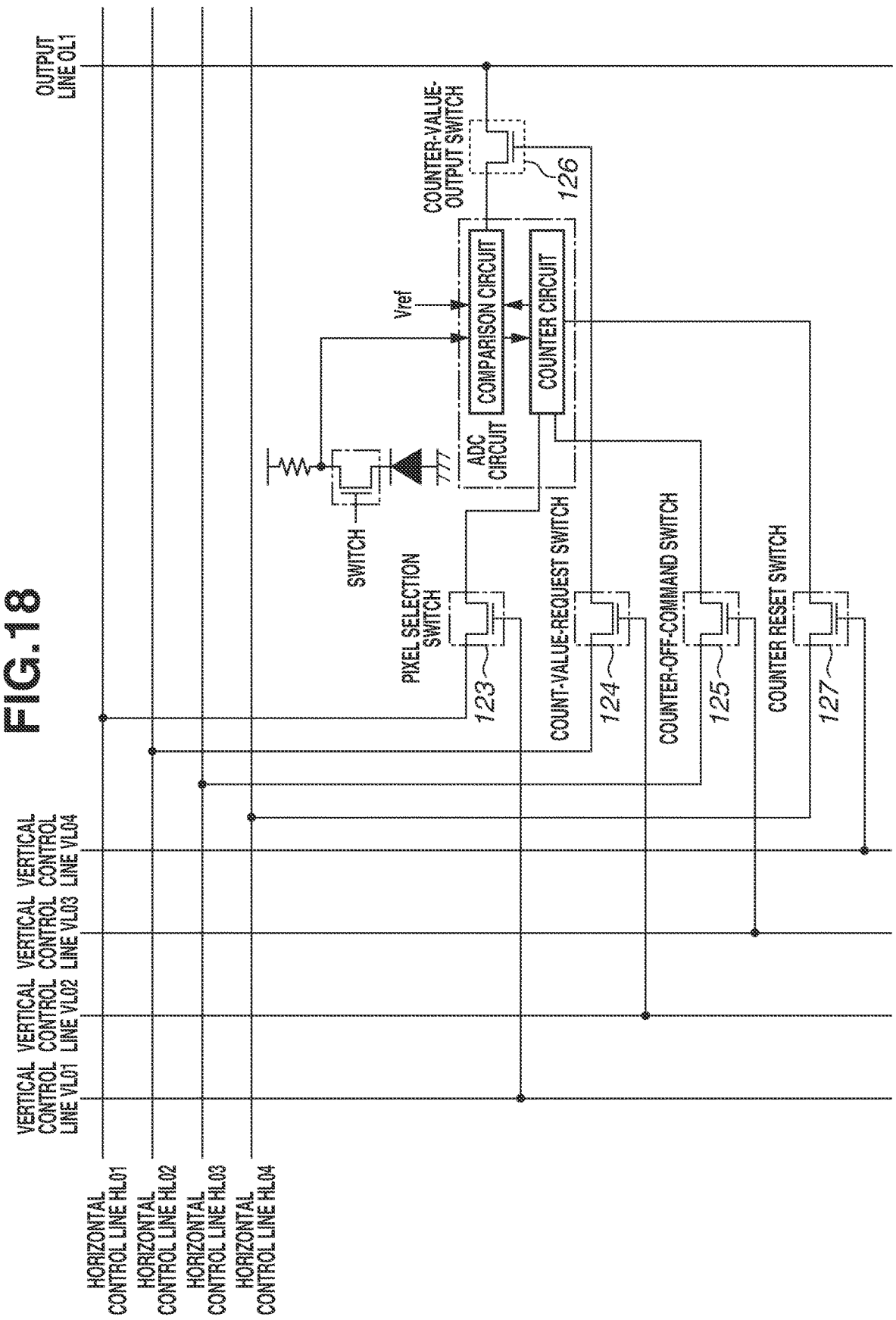
FIG. 18 illustrates a schematic configuration of a pixel according to the eighth exemplary embodiment.

FIG. 18 illustrates a configuration example of a pixel according to the present exemplary embodiment. The pixel includes a photoelectric conversion unit, a switch, a power supply unit, a ground, a resistor, and the ADC circuit. The pixel further includes a pixel selection switch 123, a count-value-request switch 124, a counter-off-command switch 125, a counter-value-output switch 126, and a counter reset switch 127. The ADC counter circuit includes the counter circuit and the comparison circuit. The Vref signal and the configuration of the comparison circuit are similar to those described with reference to FIG. 17. While FIG. 18 illustrates an example in which each switch is configured with a transistor, the configuration of the switch is not limited to the transistor. A transfer gate may be used as each switch.

The pixel selection switch 123, the count-value-request switch 124, the counter-off-command switch 125, the counter-value-output switch 126, and the counter reset switch 127 are connected to the counter circuit in the ADC circuit. Other than this configuration, the configuration and the function of the pixel are similar to those described in the seventh exemplary embodiment, and thus, descriptions thereof are omitted.

The processing of the counter control operation and the timing chart according to the present exemplary embodiment are similar to those in a case where a single photon avalanche diode (SPAD) pixel that performs photon counting is used (as illustrated in FIGS. 13 to 16).

According to the present exemplary embodiment, a signal based on a signal output from a pixel is input to the pixel as described above. More specifically, a signal for controlling the counter circuit is input to the counter circuit of the pixel on the basis of a signal output from the counter circuit.

The present exemplary embodiment also enables the counter control circuit 106 to control each of the plurality of pixels, as in the seventh exemplary embodiment. Thus, the circuit scale can be reduced compared with the configuration in which the counter control circuit 106 is arranged for each pixel. Additionally, power consumption can be reduced by the counter circuit being turned off in a case where the count value is greater than or equal to the count-upper limit.

Figure 19:
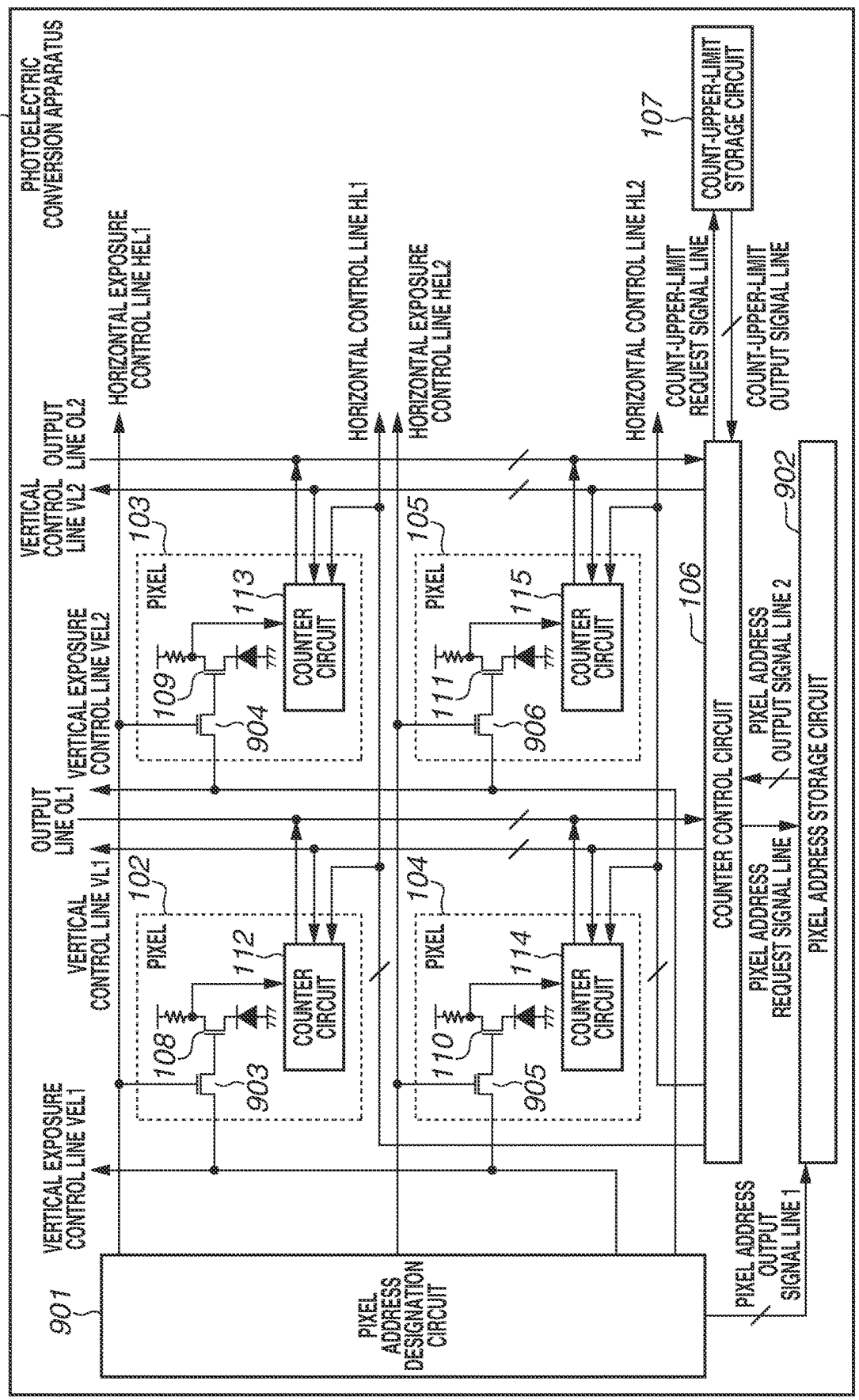
FIG. 19 illustrates a schematic configuration of a photoelectric conversion apparatus according to a ninth exemplary embodiment.

A ninth exemplary embodiment of the present disclosure will be described below. FIG. 19 illustrate a configuration example of a photoelectric conversion apparatus 101 according to the present exemplary embodiment. The photoelectric conversion apparatus 101 according to the present exemplary embodiment is different from the seventh exemplary embodiment in that the exposing of each pixel is controlled in the present exemplary embodiment. The ninth exemplary embodiment will be described, assigning the same reference numerals or signs to portions similar to the seventh exemplary embodiment and omitting descriptions thereof.

The photoelectric conversion apparatus 101 according to the present exemplary embodiment includes a pixel address designation circuit 901, and a pixel address storage circuit 902 in addition to the components illustrated in FIG. 11. The pixels 102 to 105 include exposure command switches 903 to 906, respectively.

A horizontal exposure control line HEL1 is connected to the pixel address designation circuit 901 and the exposure command switches 903 and 904 of the pixels 102 and 103 arranged in the horizontal direction. A horizontal exposure control line HEL2 is connected to the pixel address designation circuit 901 and the exposure command switches 905 and 906 of the pixels 104 and 105 arranged in the horizontal direction. A vertical exposure control line VEL1 is connected to the pixel address designation circuit 901 and the exposure command switches 903 and 905 of the pixels 102 and 104 arranged in the vertical direction. The number of bits of each of the signals is not limited. A vertical exposure control line VEL2 is connected to the pixel address designation circuit 901 and the exposure command switches 904 and 906 of the pixels 103 and 105 arranged in the vertical direction.

The horizontal exposure control line HEL1 is used for transmitting an exposure command signal from the pixel address designation circuit 901 to switches 108 and 109 of the pixels 102 and 103 via the exposure command switches 903 and 904, respectively. The horizontal exposure control line HEL2 is used for transmitting the exposure command signal from the pixel address designation circuit 901 to switches 110 and 111 of the pixels 104 and 105 via the exposure command switches 905 and 906, respectively.

The vertical exposure control line VEL1 is used for transmitting the exposure command signal from the pixel address designation circuit 901 to the switches 108 and 110 of the pixels 102 and 104 via the exposure command switches 903 and 905, respectively. The vertical exposure control line VEL2 is used for transmitting the exposure command signal from the pixel address designation circuit 901 to switches 109 and 111 of the pixels 103 and 105 via the exposure command switches 904 and 906, respectively.

A pixel address output signal line 1 is connected to the pixel address designation circuit 901 and the pixel address storage circuit 902. The range of bits for the pixel address output signal line 1 is not limited.

The pixel address designation circuit 901 transmits a pixel address of a pixel to be exposed to the pixel address storage circuit 902 by the pixel address output signal line 1.

A pixel address request signal line and a pixel address output signal line 2 are connected to the pixel address storage circuit 902 and the counter control circuit 106. The range of bits for the pixel address output signal line 2 is not limited.

The counter control circuit 106 transmits a signal for requesting an address of a pixel to be controlled to the pixel address storage circuit 902 by the pixel address request signal line.

The pixel address storage circuit 902 outputs the address of the pixel to be controlled to the counter control circuit 106 by the pixel address output signal line 2.

The above-described configuration enables the control of each pixel while limiting target pixels to exposed pixels by using the pixel address designation circuit 901 and the pixel address storage circuit 902. Thus, the present exemplary embodiment reduces an operation time for the counter control while the circuit scale increases in the present exemplary embodiment, compared with the seventh exemplary embodiment.

Figure 20:
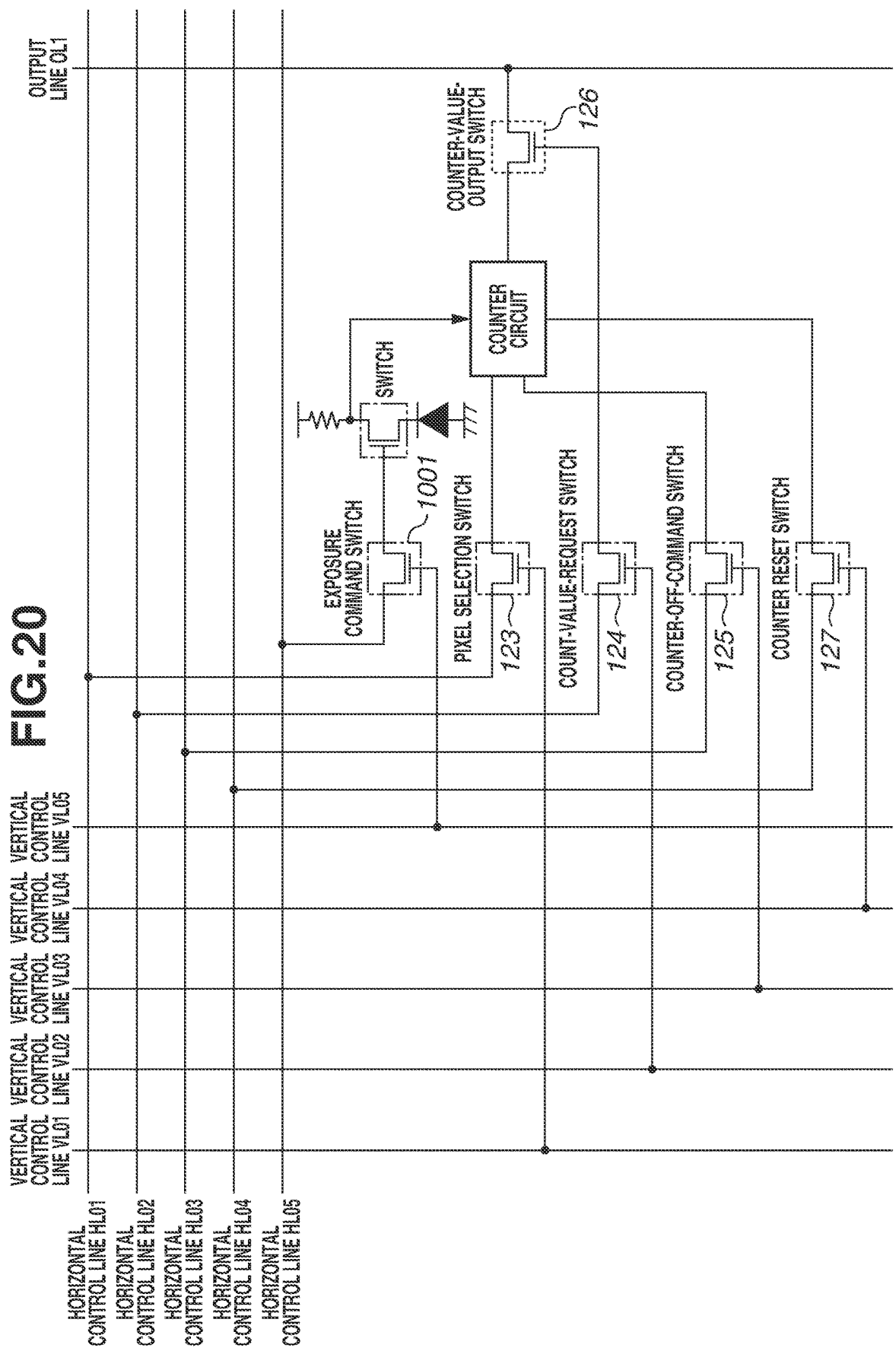
FIG. 20 illustrates a schematic configuration of a pixel according to the ninth exemplary embodiment.

FIG. 20 illustrates a pixel configuration according to the present exemplary embodiment. Descriptions of portions similar to those in FIG. 12 will be omitted.

An exposure command switch 1001 is connected to a switch.

The exposure command switch 1001 is connected to a horizontal control line HL05 and a vertical control line VL05. The horizontal control line HL05 and the vertical control line VL05 are connected to the pixel address designation circuit 901.

In a case where both the horizontal control line HL05 and the vertical control line VL05 are changed to a high level, the exposure command switch 1001 is turned on. The switch is turned on, accordingly, and an exposure is started for a target pixel.

The number of switches necessary for the counter control for each pixel is six when information about the count value is one bit. In the configuration of the present exemplary embodiment, pixels to be counter-controlled is limited with pixel addresses and the operation time can be reduced, while the circuit scale increases by the area of one switch, compared with the seventh exemplary embodiment.

Figure 21:
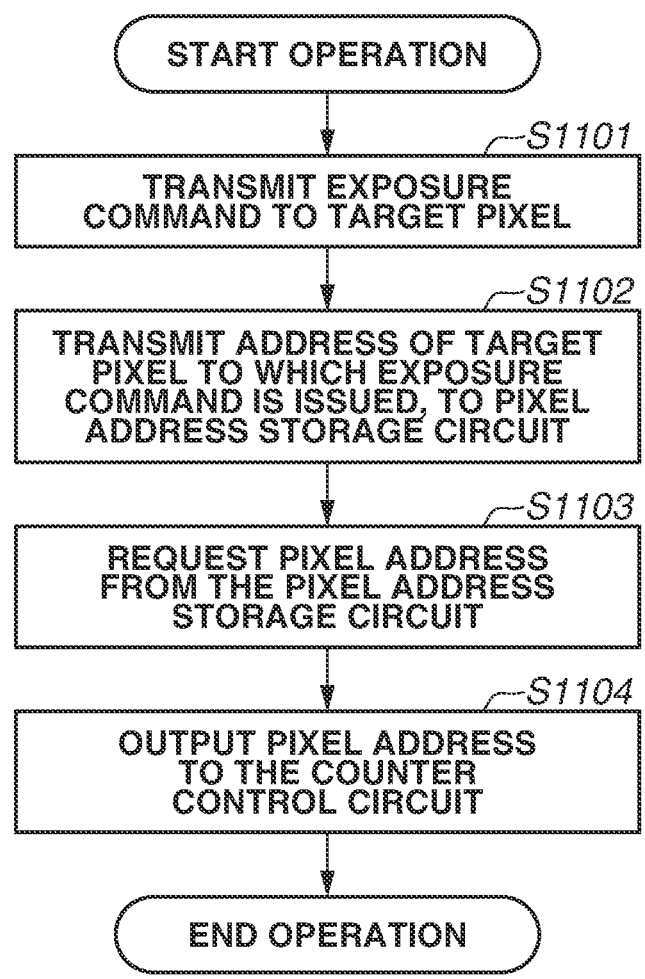
FIG. 21 is a flowchart illustrating processing for acquiring an address of a pixel to be controlled by the photoelectric conversion apparatus according to the ninth exemplary embodiment.

FIG. 21 illustrates a flowchart for acquiring an address of a pixel to be exposed, which is performed by the photoelectric conversion apparatus 101 according to the present exemplary embodiment.

Initially in step S1101, the pixel address designation circuit 901 transmits an exposure command to a target pixel. In step S1102, the address of the target pixel to which the pixel address designation circuit 901 outputs the exposure command is transmitted to the pixel address storage circuit 902.

Next in step S1103, the counter control circuit 106 requests the pixel address from the pixel address storage circuit 902. In step S1104, the pixel address storage circuit 902 then outputs the pixel address to the counter control circuit 106.

The operations in step S1101 to 1104 are repeated the same number of times as the number of pixels to be exposed. In such a case, in order to improve processing speed, pipeline processing may be performed.

Pipeline processing may be performed also in the processing of the flowchart according to the seventh exemplary embodiment illustrated in FIG. 13. In such a case, the operation in step S303 in FIG. 13 is performed after the operation in step S1104 is completed at least once.

As described above, the present exemplary embodiment enables reduction of the circuit scale compared with a configuration in which the counter control circuit 106 is provided for each pixel. Moreover, control target pixels are limited only to exposed pixels in the present exemplary embodiment, so that the processing speed is improved compared with a case where all pixels are scanned.

Figure 22:
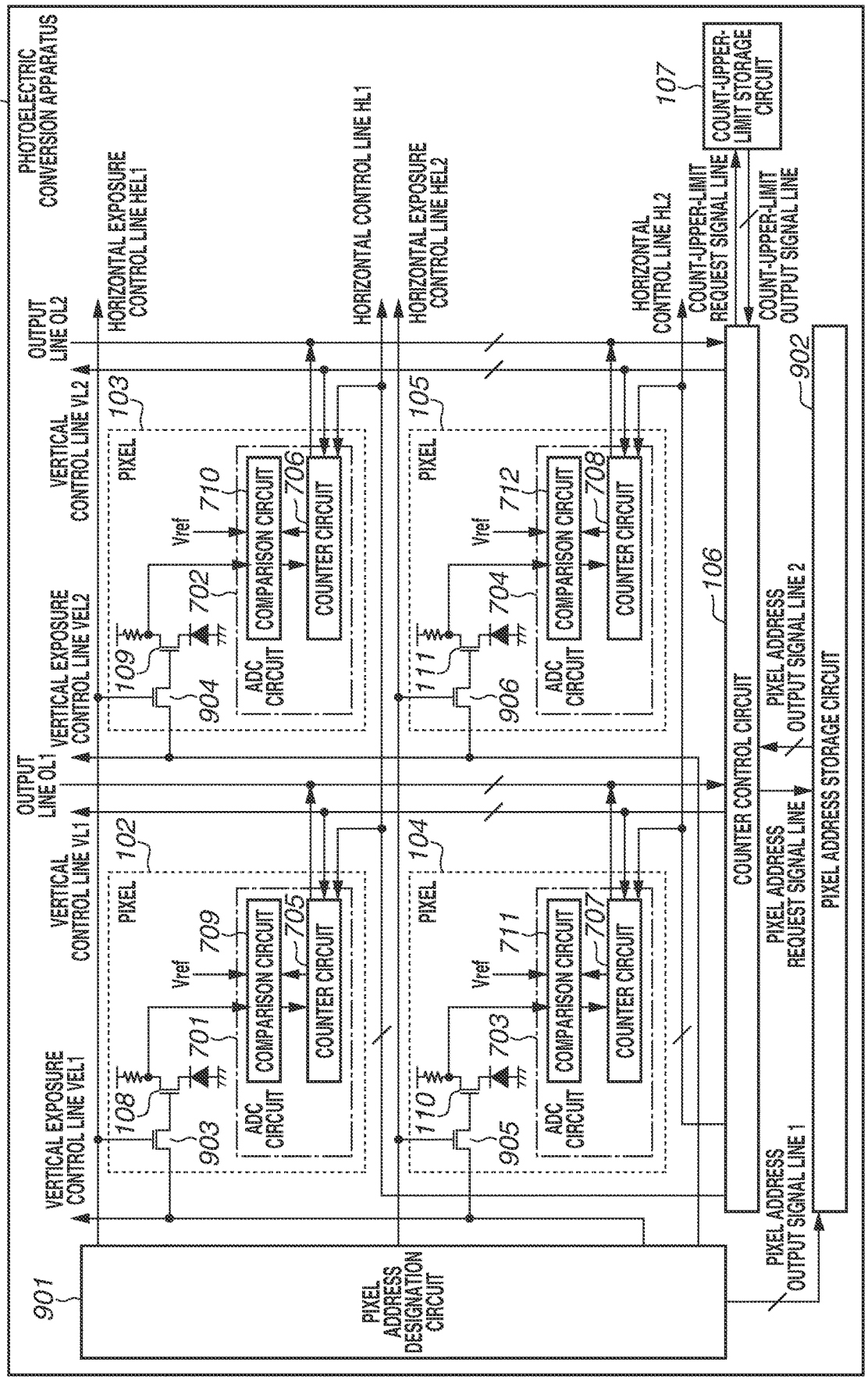
FIG. 22 illustrates a schematic configuration of a photoelectric conversion apparatus according to a tenth exemplary embodiment.

A tenth exemplary embodiment of the present disclosure will be described. FIG. 22 illustrates a configuration example of a photoelectric conversion apparatus 101 according to the present exemplary embodiment. The photoelectric conversion apparatus 101 according to the present exemplary embodiment is configured such that a photoelectric conversion unit is configured with a photodiode and each pixel includes an ADC circuit, which is different from the configuration according to the ninth exemplary embodiment. The tenth exemplary embodiment will be described, assigning the same reference numerals or signs to portions similar to the seventh exemplary embodiment or the ninth exemplary embodiment and omitting descriptions thereof.

FIG. 22 illustrates a configuration example of the photoelectric conversion apparatus 101 according to the present exemplary embodiment. The photoelectric conversion apparatus 101 according to the present exemplary embodiment includes a pixel address designation circuit 901 and a pixel address storage circuit 902 in addition to the components illustrated in FIG. 17. The pixels 102 to 105 include exposure command switches 903 to 906, respectively.

According to the present exemplary embodiment, target pixels are limited to exposed pixels by using the pixel address designation circuit 901 and the pixel address storage circuit 902, and it is possible to control each of the pixels 102 to 105. Thus, an operation time for counter control is reduced while the circuit scale of the photoelectric conversion apparatus 101 increases, compared with the configuration according to the eighth exemplary embodiment.

FIG. 23 illustrates a configuration example of a pixel according to the present exemplary embodiment. Descriptions of portions similar to those in FIG. 18 will be omitted.

An exposure command switch 1001 is connected to a switch. The configuration and the function in the present exemplary embodiment are similar to those in the ninth exemplary embodiment expect that the exposure command switch 1001 is connected to the counter circuit of the ADC circuit, and thus, descriptions thereof are omitted. The processing of flowchart for acquiring an address of a pixel to be exposed is similar to that of the flowchart in FIG. 21, and thus, descriptions thereof are omitted.

According to the present exemplary embodiment, control target pixels are limited to exposed pixels also in the photoelectric conversion apparatus 101 that includes the ADC circuit in the pixel circuit, so that the processing speed is improved compared with a case where all pixels are scanned, as described above.

The present disclosure is not limited to the above-described exemplary embodiments, and various modifications are possible. An example where a configuration of part of an exemplary embodiment is added to another exemplary embodiment and an example where a configuration of part of an exemplary embodiment is replaced by a configuration of part of another exemplary embodiment are also an exemplary embodiment of the present disclosure.

It should be noted that the exemplary embodiments disclosed herein are mere examples of implementation of the present disclosure and are not intended to limit interpretations of the technical scope of the present disclosure. In other words, the present disclosure is implementable in various forms within the technical concept or major feature of the present disclosure.

The present disclosure provides a photoelectric conversion apparatus that realizes both control of digital signal writing to and digital signal reading from a pixel and reduction of at least one of a circuit area and a wiring line area.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-180966, filed Sep. 30, 2019, and No.

2020-129815, filed Jul. 31, 2020 which are hereby incorporated by reference herein in their entirety.

What is claimed is:

1. A photoelectric conversion apparatus comprising:
   a plurality of pixels each including a photoelectric conversion unit and configured to output a digital signal corresponding to an electric charge generated by the photoelectric conversion unit;
   a first signal input/output unit; and
   a scan unit including a vertical scan circuit and a horizontal scan circuit,
   wherein the first signal input/output unit is configured to output the digital signal from the plurality of pixels and input, to the plurality of pixels, a signal based on the digital signal output from the plurality of pixels, and
   wherein the horizontal scan circuit is connected to the first signal input/output unit.

2. The photoelectric conversion apparatus according to claim 1,
   wherein the plurality of pixels each includes a storage unit,
   wherein the scan unit performs an operation of inputting the signal based on the digital signal output from the plurality of pixels to the plurality of pixels, and
   wherein the operation is a scan to store, in the storage unit, the signal based on the digital signal output from the plurality of pixels.

3. The photoelectric conversion apparatus according to claim 1, further comprising:
   a transmission line including an electric path for transmitting the digital signal from the plurality of pixels to the first signal input/output unit and configured to transmit a predetermined digital signal from the first signal input/output unit to the plurality of pixels using the electric path.

4. A photoelectric conversion apparatus comprising:
   a plurality of pixels each including a photoelectric conversion unit and a storage unit and configured to output a digital signal corresponding to an electric charge generated by the photoelectric conversion unit;
   a first signal input/output unit;
   a scan unit including a vertical scan circuit and a horizontal scan circuit; and
   a transmission line including an electric path for transmitting the digital signal from the plurality of pixels to the first signal input/output unit and configured to transmit a predetermined digital signal from the first signal input/output unit to the plurality of pixels using the electric path;
   wherein the horizontal scan circuit is connected to the first signal input/output unit.

5. The photoelectric conversion apparatus according to claim 4,
   wherein the plurality of pixels is arranged in at least one of a row direction and a column direction, and
   wherein the scan unit controls a scan to read out the digital signal to the first signal input/output unit and a scan to store, in the storage unit, the predetermined digital signal output from the first signal input/output unit.

6. The photoelectric conversion apparatus according to claim 4,
   wherein the plurality of pixels is arranged in a matrix form.

7. The photoelectric conversion apparatus according to claim 6, further comprising:
   a plurality of the first signal input/output units; and
   a plurality of column selection control lines each connected to a different one of the plurality of the first signal input/output units, and connected to the horizontal scan circuit.

8. The photoelectric conversion apparatus according to claim 4, further comprising a memory unit configured to store a plurality of pieces of data corresponding to the signal based on the digital signal and transmit the data to the first signal input/output unit.

9. The photoelectric conversion apparatus according to claim 8,
   wherein the plurality of pixels includes a defective pixel and a non-defective pixel, and
   wherein the plurality of pieces of data includes data for deactivating the defective pixel and data for activating the non-defective pixel.

10. The photoelectric conversion apparatus according to claim 9, wherein the number of bits of the signal based on the digital signal output from the plurality of pixels is greater than or equal to the number of bits of each of the predetermined digital signal.

11. The photoelectric conversion apparatus according to claim 4, wherein each of the plurality of pixels includes:
    a first pixel circuit unit connected to the first signal input/output unit and configured to generate a pixel signal based on photoelectric conversion by the photoelectric conversion unit; and
    a second pixel circuit unit configured to control an operation of a corresponding one of the plurality of pixels based on the digital signal output from the plurality of pixels.

12. The photoelectric conversion apparatus according to claim 11,
    wherein the photoelectric conversion unit includes an avalanche diode, and
    wherein the first pixel circuit unit includes a counting circuit configured to count an output from the avalanche diode.

13. The photoelectric conversion apparatus according to claim 12, wherein the second pixel circuit unit includes a control circuit configured to control an operation of the diode or an operation of the first pixel circuit unit based on the digital signal.

14. An image capturing system comprising:
    the photoelectric conversion apparatus according to claim 4; and
    a signal processing unit configured to process a signal output from the photoelectric conversion apparatus.

15. A moving object comprising:
    a photoelectric conversion apparatus according to claim 4;
    a distance information acquisition unit configured to acquire distance information about a distance to a target object from a parallax image based on a signal from the photoelectric conversion apparatus; and
    a control unit configured to control the moving object based on the distance information.

16. The photoelectric conversion apparatus according to claim 4,
    wherein the plurality of pixels each includes a counter circuit, and
    wherein the signal based on the digital signal output from a corresponding one of the plurality of pixels is input to the counter circuit of the corresponding one of the plurality of pixels.

17. The photoelectric conversion apparatus according to claim 16, wherein the signal based on the digital signal output from the corresponding one of the plurality of pixels is acquired by comparing the digital signal output from the corresponding one of the plurality of pixels and a count upper limit of the counter circuit of the corresponding one of the plurality of pixels.

18. The photoelectric conversion apparatus according to claim 17, wherein a signal for stopping the counter circuit of the corresponding one of the plurality of pixels is input to the corresponding one of the plurality of pixels in a case where the digital signal output from the corresponding one of the plurality of pixels is greater than or equal to the count upper limit.

\* \* \* \* \*